United States Patent
Xue et al.

(10) Patent No.: US 12,402,113 B2
(45) Date of Patent: Aug. 26, 2025

(54) METHOD AND APPARATUS FOR SUL COMMUNICATION USING A FIRST CARRIER AND DOWNLINK COMMUNICATION USING A SECOND CARRIER

(71) Applicant: Huawei Technologies Co., Ltd., Shenzhen (CN)

(72) Inventors: Lixia Xue, Beijing (CN); Yun Liu, Shenzhen (CN); Haibo Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 383 days.

(21) Appl. No.: 18/001,392

(22) PCT Filed: Mar. 19, 2021

(86) PCT No.: PCT/CN2021/081780
§ 371 (c)(1),
(2) Date: Dec. 9, 2022

(87) PCT Pub. No.: WO2021/248969
PCT Pub. Date: Dec. 16, 2021

(65) Prior Publication Data
US 2023/0300810 A1    Sep. 21, 2023

(30) Foreign Application Priority Data

Jun. 10, 2020  (CN) .......................... 202010524848.X
Jul. 15, 2020  (CN) .......................... 202010688837.5

(51) Int. Cl.
H04W 72/0453    (2023.01)
H04L 5/14       (2006.01)

(52) U.S. Cl.
CPC .......... *H04W 72/0453* (2013.01); *H04L 5/14* (2013.01)

(58) Field of Classification Search
CPC ........ H04L 5/14; H04L 5/0094; H04W 16/14; H04W 72/0446; H04W 72/0453
See application file for complete search history.

(56) References Cited

U.S. PATENT DOCUMENTS

2018/0376510 A1*  12/2018  Sun ..................... H04W 74/006
2019/0222361 A1*  7/2019   Cheng ................. H04L 25/0226
(Continued)

FOREIGN PATENT DOCUMENTS

CN    109803398 A    5/2019
CN    110034900 A    7/2019
(Continued)

OTHER PUBLICATIONS

China Telecom, Huawei, Hisilicon, VIVO, new SUL band on TDD frequency, 3GPP TSG-RAN WG4 Meeting NR#3, R4-1709574, Nagoya, Japan, Sep. 18-21, 2017, total 2 pages.

*Primary Examiner* — Benjamin H Elliott, IV
(74) *Attorney, Agent, or Firm* — Slater Matsil, LLP

(57) ABSTRACT

The method includes: receiving a first uplink signal and/or an uplink channel by using a first uplink carrier, where the first uplink carrier is used for supplementary uplink SUL transmission, a band in which the first uplink carrier is located further includes another resource used for downlink transmission, and the band in which the first uplink carrier is located is a TDD band; and sending a second downlink signal and/or a downlink channel by using a second downlink carrier, where a band in which the second downlink carrier is located is a TDD band or an FDD band used for uplink transmission and downlink transmission.

20 Claims, 7 Drawing Sheets

(56) References Cited

U.S. PATENT DOCUMENTS

| | | | |
|---|---|---|---|
| 2019/0327069 A1* | 10/2019 | Novlan | H04L 5/0039 |
| 2020/0280899 A1* | 9/2020 | Zhang | H04W 48/10 |
| 2020/0367289 A1* | 11/2020 | Choi | H04L 5/0053 |
| 2021/0058974 A1* | 2/2021 | Park | H04W 76/27 |
| 2021/0176752 A1* | 6/2021 | Yang | H04W 72/0453 |
| 2021/0274483 A1* | 9/2021 | Zhang | H04L 5/1469 |
| 2022/0167393 A1* | 5/2022 | Singh | H04L 1/189 |
| 2022/0304043 A1* | 9/2022 | Fu | H04W 72/1268 |
| 2023/0029745 A1* | 2/2023 | Cui | H04W 72/0453 |
| 2023/0156459 A1* | 5/2023 | Jin | H04B 7/0628 370/280 |
| 2023/0217420 A1* | 7/2023 | Zhang | H04L 5/0023 370/280 |
| 2023/0239084 A1* | 7/2023 | Rico | H04L 5/1469 370/329 |
| 2023/0300810 A1* | 9/2023 | Xue | H04L 5/14 370/280 |
| 2023/0344566 A1* | 10/2023 | Wang | H04B 17/347 |
| 2023/0354433 A1* | 11/2023 | Xue | H04W 74/006 |

FOREIGN PATENT DOCUMENTS

| | | |
|---|---|---|
| CN | 110832939 A | 2/2020 |
| CN | 110859003 A | 3/2020 |
| CN | 111200873 A | 5/2020 |

* cited by examiner

METHOD AND APPARATUS FOR SUL COMMUNICATION USING A FIRST CARRIER AND DOWNLINK COMMUNICATION USING A SECOND CARRIER

CROSS-REFERENCE TO RELATED APPLICATIONS

This application is a National Stage of International Application No. PCT/CN2021/081780, filed on Mar. 19, 2021, which claims priority to Chinese Patent Application No. 202010524848.X, filed on Jun. 10, 2020 and Chinese Patent Application No. 202010688837.5, filed on Jul. 15, 2020, all of which are hereby incorporated by reference in their entireties.

TECHNICAL FIELD

This application relates to the communication field, and more specifically, to a method for determining an SUL band and an apparatus in the communication field.

BACKGROUND

A conventional cell includes one downlink carrier and one uplink carrier. A base station sends a downlink signal to a terminal by using the downlink carrier, and the terminal sends an uplink signal to the base station by using the uplink carrier. When the cell is a time division duplex (time division duplex, TDD) cell, the uplink carrier and the downlink carrier are at a same frequency. When the cell is a frequency division duplex (frequency division duplex, FDD) cell, the uplink carrier and the downlink carrier are at two separate frequencies, and there is a frequency spacing between the two frequencies. TDD is time division duplex. To be specific, uplink and downlink multiplexing is performed in a same frequency band based on different time domain resources. FDD is frequency division duplex. To be specific, uplink and downlink multiplexing is performed in different frequency bands.

A frequency band used at an initial stage of deployment of the fifth generation (the fifth generation, 5G) mobile communication system is higher than a frequency band of the 4th generation (4th generation, 4G) mobile communication system. For example, a 3.5 Gigahertz (Giga Hertz, GHz) band is used in 5G deployment. An electromagnetic wave with a higher frequency is featured by greater attenuation, and a transmit power of a terminal is lower than that of a base station. Therefore, a terminal at a cell edge can receive a downlink signal from the base station, but the base station cannot receive an uplink signal from the terminal. As a result, an uplink coverage area is smaller than a downlink coverage area.

To improve uplink coverage of a 5G cell, one or more additional uplink carriers at lower frequencies may be used in addition to an original uplink carrier of the cell, to send an uplink signal. The uplink carrier at a lower frequency may be referred to as a "supplementary uplink (supplemental uplink, SUL) band" or an "SUL carrier". Uplink transmission is performed by using an uplink resource provided by the SUL carrier, so that coverage in a cell edge scenario can be improved.

In existing spectrum planning, it is difficult to obtain a spectrum resource of the SUL carrier. There is no dedicated band that can be used as an SUL resource only for uplink transmission. In addition, with the development of diversified 5G services, SULs are used to meet both a requirement for an uplink coverage area and a requirement for uplink capacity improvement. Therefore, more SUL resources need to be provided. In conclusion, how to deploy SUL resources more effectively and flexibly and improve an uplink coverage area by using SULs is a problem that urgently needs to be resolved.

SUMMARY

This application provides a method and an apparatus for determining an SUL band. According to the method, an existing low-frequency TDD band or FDD band can be multiplexed for SUL transmission, to improve transmission efficiency, and increase an uplink capacity by scheduling or occupying more uplink bands.

According to a first aspect, a resource determining method is provided, including: receiving a first uplink signal and/or an uplink channel by using a first uplink carrier, where the first uplink carrier is used for supplementary uplink SUL transmission, a band in which the first uplink carrier is located further includes another resource used for downlink transmission, and the band in which the first uplink carrier is located is a TDD band; and sending a second downlink signal and/or a downlink channel by using a second downlink carrier, where a band in which the second downlink carrier is located is a TDD band or an FDD band used for uplink transmission and downlink transmission.

Optionally, the first uplink carrier and the second uplink carrier belong to a same cell; or the first uplink carrier, the second uplink carrier, and the second downlink carrier all belong to a same cell.

With reference to the first aspect, in some possible implementations, a frequency channel number of the band in which the first uplink carrier is located is different from a frequency channel number of a band in which a second uplink carrier corresponding to the second downlink carrier is located.

According to the foregoing technical solution, in this embodiment of this application, an existing low-frequency TDD band or FDD band can be multiplexed for SUL transmission, and mutual interference between normal uplink transmission, downlink transmission, and SUL transmission can be avoided, so that user equipment can perform SUL transmission in the TDD band to send an uplink signal/channel. In this way, an SUL resource can be effectively and flexibly deployed, and an uplink coverage area can be improved by using the SUL band. With reference to the first aspect and the foregoing implementations, in some possible implementations, the first uplink carrier is associated with a first identifier.

With reference to the first aspect and the foregoing implementations, in some possible implementations, the first identifier is different from an identifier of the TDD band in which the first uplink carrier is located.

With reference to the first aspect and the foregoing implementations, in some possible implementations, the first identifier defines the band in which the first uplink carrier is located as an SUL band; or the first identifier defines a band combination, and the band combination is a band combination of at least one first uplink carrier and the second uplink carrier.

For example, the first identifier may define the SUL band. In other words, the SUL band may multiplex the low-frequency TDD band for SUL transmission, and a definition identifier of the SUL band is different from a definition identifier of the existing low-frequency TDD band. For a band in a frequency range, in addition to being defined as an original TDD band, a new identifier is defined for the SUL band. In a subsequent use process, the base station and the terminal may distinguish, according to different identifiers, whether the current band can be used as the first band or the SUL band.

Optionally, the first identifier may be a number or an annotation added to the identifier of the existing TDD band, and indicates that a band including the newly added number or annotation may be used as an SUL band for SUL transmission. For example, a superscript a is further added to the band number of the existing TDD band based on a band number of the existing TDD band, to indicate that a band including the newly added number may be used as an SUL band.

Alternatively, when the SUL band multiplexes the low-frequency TDD band, in addition to a separately defined SUL band, a combination of bands having an association relationship may be defined, that is, the TDD band and the SUL band are jointly defined. The method for defining the band combination is simple and easy to implement, and band coexistence evaluation, research, and the like do not need to be repeatedly performed.

It should be understood that, in this embodiment of this application, the SUL band may multiplex an existing TDD band, so that a frequency channel number of the SUL band is lower than a frequency channel number of a TDD band used for normal transmission, or the SUL band may multiplex a band with a high frequency channel number of another user equipment. This falls within the protection scope of this application.

It should be further understood that, in this embodiment of this application, that a band is used as an SUL band may be that all or some of uplink time domain resources of the band are used for SUL transmission. In other words, an uplink signal/channel is sent to a network device. This is not limited in this embodiment of this application. With reference to the first aspect and the foregoing implementations, in some possible implementations, the first identifier is the same as an identifier of the TDD band in which the first uplink carrier is located, the first identifier further includes first indication information, and the first indication information indicates whether the TDD band in which the first uplink carrier is located is used for SUL transmission.

Specifically, in addition to the plurality of independently defined SUL bands described above, only a TDD band may be defined according to the existing solution, and whether the TDD band is used for SUL transmission may be marked. Alternatively, a TDD band combination is defined, and whether the TDD band combination is used for SUL transmission may be marked.

With reference to the first aspect and the foregoing implementations, in some possible implementations, the first indication information is predefined information, or the first indication information is explicit indication information.

Optionally, the possible first indication information listed above may be predefined information. For example, the first indication information is already defined in a standard, and the base station and the terminal may clearly determine, based on whether the band includes the first indication information, whether the band is used for SUL transmission. Alternatively, the first indication information may be explicit indication information.

For example, if the SUL band multiplexes an original identifier of the TDD band, in an implementation process, a superscript or a comment may be added to the original identifier of the TDD band, and the terminal is further notified, in configuration information of a system message SIB, that the added superscript or comment indicates that the TDD band is used for SUL transmission.

Alternatively, at least one TDD band is associated in an explicit manner by using the configuration information of the SIB, to indicate that the at least one TDD band is used for SUL transmission.

Alternatively, a TDD band is configured in an implicit indication manner for SUL transmission by using the configuration information of the SIB, for example, in a manner of configuring an SUL PRACH resource, an SUL time-frequency resource subset, or feature information of the SUL band for the terminal. A manner of indicating, by using explicit indication information or implicit indication information, that the TDD band is used for SUL transmission is not limited in this embodiment of this application.

According to the foregoing solution, the first indication information is added to the existing TDD band, so that whether the band is used for SUL transmission is indicated by using the first indication information, or whether the band combination is used for SUL transmission is defined in a TDD band combination. An indication manner is simple and clear. Specifically, in a process of communication between the base station and the terminal, the terminal may quickly specify a location of a SUL resource in the TDD band based on a current TDD band or TDD band combination and indication information that is used for SUL transmission and that is included in the TDD band or the TDD band combination, and the base station does not need to indicate the SUL resource by using other additional indication information. This simplifies a communication procedure and reduces signaling overheads.

With reference to the first aspect and the foregoing implementations, in some possible implementations, when the TDD band or the band combination in which the first uplink carrier is located is used for SUL transmission, the method further includes: receiving capability information reported by the user equipment. The capability information includes the first identifier; or the capability information indicates that the user equipment is used for uplink transmission, downlink transmission, and/or sidelink transmission in the TDD band in which the first uplink carrier is located; or the capability information indicates that the user equipment is not used for SUL transmission in the TDD band in which the first uplink carrier is located; or the capability information indicates that the user equipment supports both TDD transmission and SUL transmission, and a priority of a capability of performing SUL transmission by the user equipment is lower than a priority of a capability of performing TDD transmission by the user equipment.

When the first indication information indicates that the multiplexed TDD band is used for SUL transmission, to implement uplink transmission between the base station and the terminal in the SUL band, the terminal needs to report capability information of the terminal to the base station. It should be understood that different types of terminals may have different capabilities. For example, some terminals support SUL transmission, and some terminals do not support SUL transmission. In this embodiment of this application, different terminals may be further defined as three different types based on different capabilities of the terminals. The base station may configure different SUL resources for different terminals based on capabilities of the terminals in different bands, so that transmission reliability can be improved.

It should be understood that sidelink transmission herein may be understood as a "sidelink", and the sidelink may be applied to a scenario in which there is no network coverage, a scenario in which devices communicate with each other, or the like. Specifically, for a manner of transmitting signals/channels in different scenarios, refer to the SUL transmission manner provided in this embodiment of this application. Details are not described herein again.

With reference to the first aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

Specifically, when the first uplink carrier is used for SUL transmission, a configuration process of a time domain resource may specifically include a plurality of cases. For example, the slot used by the first uplink carrier is configured as a subset of uplink slots and/or flexible slots to which a band multiplexed by the SUL band belongs; or the symbol used by the first uplink carrier is configured as a subset of uplink symbols and/or flexible symbols to which the band in which the first uplink carrier is located belongs; or the slot used by the first uplink carrier is configured as a subset of uplink symbols and/or flexible symbols to which the band in which the first uplink carrier is located belongs; or the symbol used by the first uplink carrier is configured as a subset of uplink slots and/or flexible slots to which the band in which the first uplink carrier is located belongs, or the like.

It should be understood that the subset herein may include an equal case. In other words, the time domain resource of the SUL band may be configured according to a slot configuration rule and/or a symbol configuration rule of the multiplexed TDD band. A configuration method and rule of the time domain resource of the SUL band are not limited in this embodiment of this application. In conclusion, in this embodiment of this application, the SUL band used for SUL transmission is determined for the terminal during resource scheduling and allocation through scheduling by the base station. Specifically, the SUL band may multiplex the existing low-frequency TDD band or FDD band, interference between NDL and SUL transmission is avoided during SUL resource configuration, and an uplink signal/channel is sent in some or all uplink time domain resources of the SUL band. This improves transmission efficiency and increases a network capacity.

According to a second aspect, a resource determining method is provided, including: receiving first configuration information by using a second downlink carrier, where the first configuration information indicates configuration information of a first uplink carrier, the configuration information of the first uplink carrier includes slot and/or symbol configuration information used for supplementary uplink SUL transmission, bands in which a second uplink carrier and the second downlink carrier corresponding to the second uplink carrier are located each are a TDD band or an FDD band used for uplink transmission and downlink transmission, the first uplink carrier is used for SUL transmission, a frequency channel number of a band in which the first uplink carrier is located is different from a frequency channel number of the band in which the second uplink carrier is located, and the first uplink carrier and the second downlink carrier belong to a same cell; and sending a first uplink signal and/or an uplink channel to a network device by using the first uplink carrier.

It should be understood that, a user equipment side may synchronize with a base station in an auxiliary manner, for example, UE measurement. Details are not described in this embodiment of this application. With reference to the second aspect, in some possible implementations, the first uplink carrier is associated with a first identifier.

With reference to the second aspect and the foregoing implementations, in some possible implementations, the first identifier is different from an identifier of a TDD band in which the first uplink carrier is located.

With reference to the second aspect and the foregoing implementations, in some possible implementations, the first identifier defines the band in which the first uplink carrier is located as an SUL band; or the first identifier defines a band combination, and the band combination is a band combination of at least one first uplink carrier and the second uplink carrier.

With reference to the second aspect and the foregoing implementations, in some possible implementations, the first identifier is the same as an identifier of a TDD band in which the first uplink carrier is located, the first identifier further includes first indication information, and the first indication information indicates whether the TDD band in which the first uplink carrier is located is used for SUL transmission.

With reference to the second aspect and the foregoing implementations, in some possible implementations, the first indication information is predefined information, or the first indication information is explicit indication information.

With reference to the second aspect and the foregoing implementations, in some possible implementations, when the TDD band or the band combination in which the first uplink carrier is located is used for SUL transmission, the method further includes: reporting capability information to the network device. The capability information includes the first identifier; or the capability information indicates that the user equipment is used for uplink transmission, downlink transmission, and/or sidelink transmission in the TDD band in which the first uplink carrier is located; or the capability information indicates that the user equipment is not used for SUL transmission in the TDD band in which the first uplink carrier is located; or the capability information indicates that the user equipment supports both TDD transmission and SUL transmission, and a priority of a capability of performing SUL transmission by the user equipment is lower than a priority of a capability of performing TDD transmission by the user equipment.

With reference to the second aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

According to a third aspect, a resource determining method is provided, including: receiving a first uplink signal and/or an uplink channel by using a first uplink carrier, where the first uplink carrier is used for supplementary uplink SUL transmission, a band in which the first uplink carrier is located further includes another resource used for downlink transmission, and the band in which the first uplink carrier is located is a TDD band; and sending a second downlink signal and/or a downlink channel by using a second downlink carrier, where a band in which the second downlink carrier is located is a band used for supplementary downlink SDL transmission, and the first uplink carrier and the second downlink carrier belong to a same cell.

It should be understood that the foregoing solution describes a case in which this embodiment of this application is further applicable to SDL. To be specific, when there is only the second downlink carrier, the band used for SUL transmission is determined based on the second downlink carrier. Details are not described herein.

With reference to the third aspect and the foregoing implementations, in some possible implementations, a frequency channel number of the band in which the first uplink carrier is located is different from a frequency channel number of a band in which a second uplink carrier corresponding to the second downlink carrier is located.

With reference to the third aspect and the foregoing implementations, in some possible implementations, the first uplink carrier is associated with a first identifier.

With reference to the third aspect and the foregoing implementations, in some possible implementations, the first identifier is different from an identifier of the TDD band in which the first uplink carrier is located.

With reference to the third aspect and the foregoing implementations, in some possible implementations, the first identifier defines the band in which the first uplink carrier is located as an SUL band; or the first identifier defines a band combination, and the band combination is a band combination of at least one first uplink carrier and the second uplink carrier.

With reference to the third aspect and the foregoing implementations, in some possible implementations, the first identifier is the same as an identifier of the TDD band in which the first uplink carrier is located, the first identifier further includes first indication information, and the first indication information indicates whether the TDD band in which the first uplink carrier is located is used for SUL transmission.

With reference to the third aspect and the foregoing implementations, in some possible implementations, the first indication information is predefined information, or the first indication information is explicit indication information.

With reference to the third aspect and the foregoing implementations, in some possible implementations, when the TDD band or the band combination in which the first uplink carrier is located is used for SUL transmission, the method further includes: receiving capability information reported by user equipment. The capability information includes the first identifier; or the capability information indicates that the user equipment is used for uplink transmission, downlink transmission, and/or sidelink transmission in the TDD band in which the first uplink carrier is located; or the capability information indicates that the user equipment is not used for SUL transmission in the TDD band in which the first uplink carrier is located; or the capability information indicates that the user equipment supports both TDD transmission and SUL transmission, and a priority of a capability of performing SUL transmission by the user equipment is lower than a priority of a capability of performing TDD transmission by the user equipment.

With reference to the third aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

According to a fourth aspect, a resource determining method is provided, including: receiving first configuration information by using a second downlink carrier, where the first configuration information indicates configuration information of a first uplink carrier, a band in which the second downlink carrier is located is a band used for supplementary downlink SDL transmission, and the first uplink carrier and the second downlink carrier belong to a same cell; and sending a first uplink signal and/or an uplink channel to a network device by using the first uplink carrier.

With reference to the fourth aspect, in some possible implementations, the first uplink carrier is associated with a first identifier.

With reference to the fourth aspect and the foregoing implementations, in some possible implementations, the first identifier is different from an identifier of a TDD band in which the first uplink carrier is located.

With reference to the fourth aspect and the foregoing implementations, in some possible implementations, the first identifier defines the band in which the first uplink carrier is located as an SUL band; or the first identifier defines a band combination, and the band combination is a band combination of at least one first uplink carrier and the second uplink carrier.

With reference to the fourth aspect and the foregoing implementations, in some possible implementations, the first identifier is the same as an identifier of a TDD band in which the first uplink carrier is located, the first identifier further includes first indication information, and the first indication information indicates whether the TDD band in which the first uplink carrier is located is used for SUL transmission.

With reference to the fourth aspect and the foregoing implementations, in some possible implementations, the first indication information is predefined information, or the first indication information is explicit indication information.

With reference to the fourth aspect and the foregoing implementations, in some possible implementations, when the TDD band or the band combination in which the first uplink carrier is located is used for SUL transmission, the method further includes: reporting capability information to the network device. The capability information includes the first identifier; or the capability information indicates that the user equipment is used for uplink transmission, downlink transmission, and/or sidelink transmission in the TDD band in which the first uplink carrier is located; or the capability information indicates that the user equipment is not used for SUL transmission in the TDD band in which the first uplink carrier is located; or the capability information indicates that the user equipment supports both TDD transmission and SUL transmission, and a priority of a capability of performing SUL transmission by the user equipment is lower than a priority of a capability of performing TDD transmission by the user equipment.

With reference to the fourth aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

According to a fifth aspect, a resource determining method is provided, including: First user equipment performs cell search and synchronization by using a first downlink carrier, and receives a downlink signal and/or a downlink channel. The first user equipment performs supplementary uplink SUL transmission by using a second uplink carrier. The first user equipment may further perform uplink transmission by using a first uplink carrier corresponding to the first downlink carrier. Second user equipment performs cell search and synchronization by using a second downlink carrier, and receives a downlink signal and/or a downlink channel. The second user equipment performs supplementary uplink SUL transmission by using the first uplink carrier. The second user equipment may further perform uplink transmission by using the second uplink carrier corresponding to the second downlink carrier. A frequency channel number of a band in which the first uplink carrier is located is different from a frequency channel number of a band in which the second uplink carrier is located, and the first uplink carrier and the second uplink carrier belong to a same cell.

In the foregoing technical solution, the first user equipment may multiplex a TDD band of the second user equipment to perform SUL transmission, and the second user equipment may also multiplex a TDD band of the first user equipment to perform SUL transmission.

It should be understood that uplink carriers of the first user equipment 102 and the second user equipment 103 may be SUL carriers of each other, so that a capacity is increased, and a capacity of an uplink access resource is multiplied. After the first user equipment 102 and the second user equipment 103 access the cell, bands available for uplink transmission may also be multiplied. With reference to the fifth aspect, in some possible implementations, the first uplink carrier is associated with a first identifier.

With reference to the fifth aspect and the foregoing implementations, in some possible implementations, the first identifier is different from an identifier of a TDD band in which the first uplink carrier is located.

With reference to the fifth aspect and the foregoing implementations, in some possible implementations, the first identifier defines the band in which the first uplink carrier is located as an SUL band; or the first identifier defines a band combination, and the band combination is a band combination of at least one first uplink carrier and the second uplink carrier.

With reference to the fifth aspect and the foregoing implementations, in some possible implementations, the first identifier is the same as an identifier of a TDD band in which the first uplink carrier is located, the first identifier further includes first indication information, and the first indication information indicates whether the TDD band in which the first uplink carrier is located is used for SUL transmission.

With reference to the fifth aspect and the foregoing implementations, in some possible implementations, the first indication information is predefined information, or the first indication information is explicit indication information.

With reference to the fifth aspect and the foregoing implementations, in some possible implementations, when the TDD band or the band combination in which the first uplink carrier is located is used for SUL transmission, the method further includes: reporting capability information to a network device. The capability information includes the first identifier; or the capability information indicates that user equipment is used for uplink transmission, downlink transmission, and/or sidelink transmission in the TDD band in which the first uplink carrier is located; or the capability information indicates that user equipment is not used for SUL transmission in the TDD band in which the first uplink carrier is located; or the capability information indicates that user equipment supports both TDD transmission and SUL transmission, and a priority of a capability of performing SUL transmission by the user equipment is lower than a priority of a capability of performing TDD transmission by the user equipment.

With reference to the fifth aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

According to a sixth aspect, an apparatus is provided, including: a receiving unit, configured to receive a first uplink signal and/or an uplink channel by using a first uplink carrier, where the first uplink carrier is used for supplementary uplink SUL transmission, a band in which the first uplink carrier is located further includes another resource used for downlink transmission, and the band in which the first uplink carrier is located is a TDD band; and a sending unit, configured to send a second downlink signal and/or a downlink channel by using a second downlink carrier, where a band in which the second downlink carrier is located is a TDD band or an FDD band used for uplink transmission and downlink transmission.

With reference to the sixth aspect, in some possible implementations, a frequency channel number of the band in which the first uplink carrier is located is different from a frequency channel number of a band in which a second uplink carrier corresponding to the second downlink carrier is located.

With reference to the sixth aspect and the foregoing implementations, in some possible implementations, the first uplink carrier is associated with a first identifier.

With reference to the sixth aspect and the foregoing implementations, in some possible implementations, the first identifier is different from an identifier of the TDD band in which the first uplink carrier is located.

With reference to the sixth aspect and the foregoing implementations, in some possible implementations, the first identifier defines the band in which the first uplink carrier is located as an SUL band; or the first identifier defines a band combination, and the band combination is a band combination of at least one first uplink carrier and the second uplink carrier.

With reference to the sixth aspect and the foregoing implementations, in some possible implementations, the first identifier is the same as an identifier of the TDD band in which the first uplink carrier is located, the first identifier further includes first indication information, and the first indication information indicates whether the TDD band in which the first uplink carrier is located is used for SUL transmission.

With reference to the sixth aspect and the foregoing implementations, in some possible implementations, the first indication information is predefined information, or the first indication information is explicit indication information.

With reference to the sixth aspect and the foregoing implementations, in some possible implementations, when the TDD band or the band combination in which the first uplink carrier is located is used for SUL transmission, the receiving unit is further configured to receive capability information reported by user equipment. The capability information includes the first identifier; or the capability information indicates that user equipment is used for uplink transmission, downlink transmission, and/or sidelink transmission in the TDD band in which the first uplink carrier is located; or the capability information indicates that user equipment is not used for SUL transmission in the TDD band in which the first uplink carrier is located; or the capability information indicates that user equipment supports both TDD transmission and SUL transmission, and a priority of a capability of performing SUL transmission by the user equipment is lower than a priority of a capability of performing TDD transmission by the user equipment.

With reference to the sixth aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

According to a seventh aspect, an apparatus is provided, including: a receiving unit, configured to receive first configuration information by using a second downlink carrier, where the first configuration information indicates configuration information of a first uplink carrier, the configuration information of the first uplink carrier includes slot and/or symbol configuration information used for supplementary uplink SUL transmission, bands in which a second uplink carrier and the second downlink carrier corresponding to the second uplink carrier are located each are a TDD band or an FDD band used for uplink transmission and downlink transmission, the first uplink carrier is used for SUL transmission, a frequency channel number of a band in which the first uplink carrier is located is different from a frequency channel number of the band in which the second uplink carrier is located, and the first uplink carrier and the second downlink carrier belong to a same cell; and a sending unit, configured to send a first uplink signal and/or an uplink channel to a network device by using the first uplink carrier.

With reference to the seventh aspect, in some possible implementations, the first uplink carrier is associated with a first identifier.

With reference to the seventh aspect and the foregoing implementations, in some possible implementations, the first identifier is different from an identifier of the TDD band in which the first uplink carrier is located.

With reference to the seventh aspect and the foregoing implementations, in some possible implementations, the first identifier defines the band in which the first uplink carrier is located as an SUL band; or the first identifier defines a band combination, and the band combination is a band combination of at least one first uplink carrier and the second uplink carrier.

With reference to the seventh aspect and the foregoing implementations, in some possible implementations, the first identifier is the same as an identifier of the TDD band in which the first uplink carrier is located, the first identifier further includes first indication information, and the first indication information indicates whether the TDD band in which the first uplink carrier is located is used for SUL transmission.

With reference to the seventh aspect and the foregoing implementations, in some possible implementations, the first indication information is predefined information, or the first indication information is explicit indication information.

With reference to the seventh aspect and the foregoing implementations, in some possible implementations, when the TDD band or the band combination in which the first uplink carrier is located is used for SUL transmission, the sending unit is further configured to report capability information to a network device. The capability information includes the first identifier; or the capability information indicates that user equipment is used for uplink transmission, downlink transmission, and/or sidelink transmission in the TDD band in which the first uplink carrier is located; or the capability information indicates that user equipment is not used for SUL transmission in the TDD band in which the first uplink carrier is located; or the capability information indicates that user equipment supports both TDD transmission and SUL transmission, and a priority of a capability of performing SUL transmission by the user equipment is lower than a priority of a capability of performing TDD transmission by the user equipment.

With reference to the seventh aspect and the foregoing implementations, in some possible implementations, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

According to an eighth aspect, an apparatus is provided, including: a receiving unit, configured to receive a first uplink signal and/or an uplink channel by using a first uplink carrier, where the first uplink carrier is used for supplementary uplink SUL transmission, a band in which the first uplink carrier is located further includes another resource used for downlink transmission, and the band in which the first uplink carrier is located is a TDD band; and a sending unit, configured to send a second downlink signal and/or a downlink channel by using a second downlink carrier, where a band in which the second downlink carrier is located is a band used for supplementary downlink SDL transmission, and the first uplink carrier and the second downlink carrier belong to a same cell.

According to a ninth aspect, an apparatus is provided, including: a receiving unit, configured to receive first configuration information by using a second downlink carrier, where the first configuration information indicates configuration information of a first uplink carrier, a band in which the second downlink carrier is located is a band used for supplementary downlink SDL transmission, and the first uplink carrier and the second downlink carrier belong to a same cell; and a sending unit, configured to send a first uplink signal and/or an uplink channel to a network device by using the first uplink carrier.

According to a tenth aspect, a communication system is provided, including: first user equipment and second user equipment. The first user equipment performs cell search and synchronization by using a first downlink carrier, and receives a downlink signal and/or a downlink channel. The first user equipment performs supplementary uplink SUL transmission by using a second uplink carrier. The first user equipment may further perform uplink transmission by using a first uplink carrier corresponding to the first downlink carrier. The second user equipment performs cell search and synchronization by using a second downlink carrier, and receives a downlink signal and/or a downlink channel. The second user equipment performs supplementary uplink SUL transmission by using the first uplink carrier. The second user equipment may further perform uplink transmission by using the second uplink carrier corresponding to the second downlink carrier. A frequency channel number of a band in which the first uplink carrier is located is different from a frequency channel number of a band in which the second uplink carrier is located, and the first uplink carrier and the second uplink carrier belong to a same cell.

According to an eleventh aspect, a communication apparatus is provided. The communication apparatus can implement functions of the network device (for example, the base station) in the method designs of the first aspect and the third aspect. The function may be implemented by hardware, or may be implemented by hardware by executing corresponding software. The hardware or the software includes one or more units corresponding to the foregoing functions.

According to a twelfth aspect, a communication apparatus is provided. The communication apparatus can implement functions of the terminal device (or the user equipment) in the method designs of the second aspect, the fourth aspect, and the fifth aspect. The function may be implemented by hardware, or may be implemented by hardware by executing corresponding software. The hardware or the software includes one or more units corresponding to the foregoing functions.

According to a thirteenth aspect, a network device is provided, and includes a transceiver and a processor. Optionally, the terminal device further includes a memory. The processor is configured to control the transceiver to send and receive a signal. The memory is configured to store a computer program. The processor is configured to invoke the computer program from the memory and run the computer program, so that the network device performs the method according to any possible implementation of the first aspect or the third aspect.

According to a fourteenth aspect, a terminal device is provided. The terminal device includes a transceiver and a processor. Optionally, the terminal device further includes a memory. The processor is configured to control the transceiver to send and receive a signal. The memory is configured to store a computer program. The processor is configured to invoke the computer program from the memory and run the computer program, to enable the terminal device to perform the method according to any possible implementation of the second aspect, the fourth aspect, and the fifth aspect.

According to a fifteenth aspect, a communication system is provided. The system includes the network device in the sixth aspect and the terminal device in the seventh aspect.

According to a sixteenth aspect, a communication system is provided. The system includes the first user equipment and the second user equipment in the fifth aspect.

According to a seventeenth aspect, a communication apparatus is provided. The communication apparatus may be the network device in the foregoing method designs, or may be a chip disposed in the network device. The communication apparatus includes a processor, coupled to a memory and configured to execute instructions in the memory, to implement the method performed by the network device according to any possible implementation of the first aspect or the third aspect. Optionally, the communication apparatus further includes the memory. Optionally, the communication apparatus further includes a communication interface, and the processor is coupled to the communication interface.

When the communication apparatus is the network device, the communication interface may be a transceiver or an input/output interface.

When the communication apparatus is the chip configured in the network device, the communication interface may be an input/output interface.

Optionally, the transceiver may be a transceiver circuit. Optionally, the input/output interface may be an input/output circuit.

According to an eighteenth aspect, a communication apparatus is provided. The communication apparatus may be the terminal device in the foregoing method designs, or may be a chip disposed in the terminal device. The communication apparatus includes a processor, coupled to a memory, and may be configured to execute instructions in the memory, to implement the method performed by the terminal device (user equipment) according to any possible implementation of the second aspect, the fourth aspect, and the fifth aspect. Optionally, the communication apparatus further includes the memory. Optionally, the communication apparatus further includes a communication interface, and the processor is coupled to the communication interface.

When the communication apparatus is the terminal device, the communication interface may be a transceiver or an input/output interface.

When the communication apparatus is the chip configured in the terminal device, the communication interface may be an input/output interface.

Optionally, the transceiver may be a transceiver circuit. Optionally, the input/output interface may be an input/output circuit.

According to a nineteenth aspect, a computer program product is provided. The computer program product includes computer program code, and when the computer program code is run on a computer, the computer is enabled to perform the methods according to the foregoing aspects.

According to a twentieth aspect, a computer-readable storage medium is provided. The computer-readable storage medium stores program code, and when the computer program code is run on a computer, the computer is enabled to perform the methods according to the foregoing aspects.

DETAILED DESCRIPTION OF ILLUSTRATIVE EMBODIMENTS

The following describes the technical solution in this application with reference to the accompanying drawings.

The technical solution in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a 5th generation (5th generation, 5G) mobile communication system or a new radio (new radio, NR) communication system, and a future mobile communication system.

Figure 1:
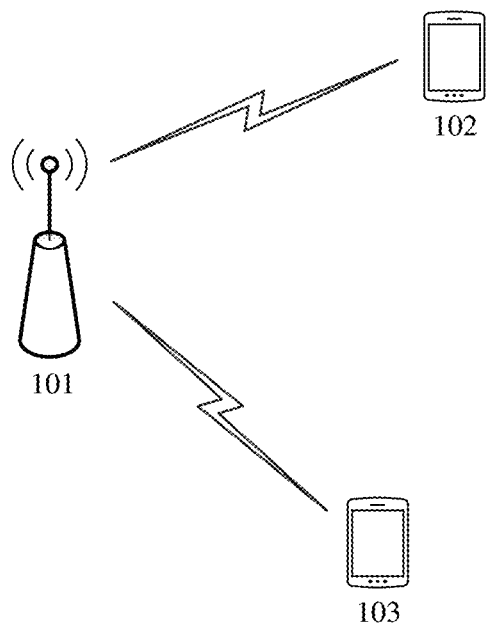
FIG. 1 is a schematic diagram of an architecture of a mobile communication system applicable to an embodiment of this application.

FIG. 1 is a schematic diagram of an architecture of a mobile communication system applicable to an embodiment of this application. As shown in FIG. 1, the wireless communication system may include at least one network device 101. The network device 101 communicates with one or more terminal devices (for example, a terminal device 102 and a terminal device 103 that are shown in FIG. 1). When the network device sends a signal, the network device is a transmit end, and the terminal device is a receive end. On the contrary, when the terminal device sends a signal, the terminal device is a transmit end, and the network device is a receive end.

The terminal device may be located at a fixed location, or may be mobile. FIG. 1 is only a schematic diagram. The communication system may further include another network device, for example, may further include a wireless relay device and a wireless backhaul device, which are not shown in FIG. 1. Types and quantities of network devices and terminal devices included in the mobile communication system are not limited in this embodiment of this application.

In the mobile communication system 100, a terminal device wirelessly accesses a network device in the mobile communication system. The radio access network device 101 may be a base station, an evolved NodeB (evolved NodeB, eNB), a home base station, an access point (access point, AP) in a wireless fidelity (wireless fidelity, Wi-Fi) system, a wireless relay node, a wireless backhaul node, a transmission point (transmission point, TP), a transmission reception point (transmission and reception point, TRP), a gNB in an NR system, or a component or a part of a device included in a base station, for example, a central unit (central unit, CU), a distributed unit (distributed unit, DU), or a baseband unit (baseband unit, BBU). It should be understood that a specific technology used by and a specific device form of the network device are not limited in embodiments of this application. In this application, unless otherwise specified, the network device is a radio access network device. In this application, the network device may be a network device itself, or may be a chip used in the network device to complete a wireless communication processing function.

The terminal device in the mobile communication system 100 may also be referred to as a terminal, user equipment (user equipment, UE), a mobile station (mobile station, MS), a mobile terminal (mobile terminal, MT), or the like. The terminal device in embodiments of this application may be a mobile phone (mobile phone), a tablet computer (Pad), or a computer with a wireless transceiver function, or may be a wireless terminal used in scenarios such as a virtual reality (virtual reality, VR), an augmented reality (augmented reality, AR), industrial control (industrial control), self-driving (self-driving), telemedicine (remote medical), a smart grid (smart grid), transportation safety (transportation safety), a smart city (smart city), and a smart home (smart home). In this application, the terminal device and a chip that can be used in the terminal device are collectively referred to as a terminal device. It should be understood that a specific technology used by and a specific device form of the terminal device are not limited in embodiments of this application.

This embodiment of this application is applicable to downlink data transmission, or uplink data transmission, or device-to-device (device-to-device, D2D) data transmission. During downlink data transmission, a data sending device is a network device, and a data receiving device is a terminal device. After receiving downlink data, the terminal device sends feedback information to the network device, to notify the network device whether the downlink data is correctly received by the terminal device. During uplink data transmission, a data sending device is a terminal device, and a data receiving device is a network device. After receiving uplink data, the network device sends feedback information to the terminal device, to notify the terminal device whether the uplink data is correctly received by the network device. During D2D signal transmission, a data sending device is a terminal device, and a data receiving device is also a terminal device. A data transmission direction is not limited in this embodiment of this application.

It should be understood that division of manners, cases, types, and embodiments in embodiments of this application are only for ease of description, but should not constitute any special limitation, and features in various manners, types, cases, and embodiments may be combined when there is no contradiction.

It should be further understood that the terms "first", "second", and "third" in embodiments of this application are merely used for distinguishing, and should not be construed as any limitation on this application. For example, in this embodiment of this application, a "first uplink carrier" represents a carrier on which SUL transmission is performed, and a "second uplink carrier" represents a carrier on which normal uplink transmission and downlink transmission are performed between the user equipment and the network device. Details are described in this embodiment, and details are not described herein.

It should be further understood that sequence numbers of the processes do not mean execution sequences in various embodiments of this application. The execution sequences of the processes should be determined according to functions and internal logic of the processes, and should not be construed as any limitation on the implementation processes of embodiments of this application.

It should be further noted that in embodiments of this application, "presetting" or "predefining" may be implemented by prestoring corresponding code or a table in a device (for example, including a terminal device and a network device), or in another manner that may be used to indicate related information. A specific implementation of "presetting", "predefining", or the like is not limited in this application, for example, predefined information in this embodiment of this application.

It should be noted that the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes in detail the technical solution provided in this application with reference to the accompanying drawings. To facilitate understanding of embodiments of this application, the following briefly describes several concepts in this application.

1. Slot (Time Slot) and Time Domain Symbol (Symbol)

A slot may be understood as a part of serial self-multiplexing of slot information dedicated to a single channel. A slot can be considered as a channel.

In embodiments of this application, a symbol is also referred to as a time domain symbol, and may be an orthogonal frequency division multiplexing (orthogonal frequency division multiplexing, OFDM) symbol or a single carrier frequency division multiple access (single carrier frequency division multiple access, SC-FDMA) symbol. SC-FDMA is also referred to as orthogonal frequency division multiplexing with transform precoding (orthogonal frequency division multiplexing with transform precoding, OFDM with TP).

For example, for a frame structure in an FDD mode, duration is 10 ms, and each frame includes 10 subframes and 20 slots. Each subframe includes two slots, and each slot is 0.5 ms.

Each slot in LTE may have several resource blocks, and each resource block includes a plurality of subcarriers.

For a frame structure in a TDD mode, duration of a system frame is 10 ms, and the system frame includes two half-frames of 5 ms. Each half-frame consists of five subframes each with duration of 1 ms, including four normal frames and one special subframe. Therefore, it may be understood that the entire 10 ms system frame is divided into 10 subframes each with duration of 1 ms, which are used as data scheduling and transmission units, that is, transmission time intervals (transmission time intervals, TTI's).

2. Physical Uplink Channel

A physical uplink channel is a channel used to carry uplink control information (uplink control information, UCI) and/or uplink data. For example, the physical uplink channel may include a physical uplink control channel (physical uplink control channel, PUCCH) and a physical uplink shared channel (physical uplink share channel, PUSCH) that are defined in an LTE protocol or an NR protocol, and another uplink channel that has the foregoing functions and that is defined as a network evolves.

3. Downlink Control Information (Download Control Information, DCI)

Downlink control information is mainly used to send downlink scheduling assignment information, and has a plurality of different formats, including but not limited to DCI formats 0-0, 0-1, 1-0, 1-1, 2-0, 2-1, 2-2, 2-3, and the like.

4. Supplementary Uplink (Supplementary Uplink, SUL)

A frequency band used at an initial deployment stage of a fifth generation mobile communication system is higher than a frequency band of a 4th generation (4th generation, 4G) mobile communication system. For example, a 3.5 Gigahertz (Giga Hertz, GHz) frequency band is used in 5G deployment. An electromagnetic wave with a higher frequency has a greater attenuation, and a transmit power of a terminal is lower than that of a base station. Therefore, a terminal at a cell edge can receive a downlink signal from the base station, but the base station cannot receive an uplink signal from the terminal. As a result, an uplink coverage area is smaller than a downlink coverage area.

Figure 2:
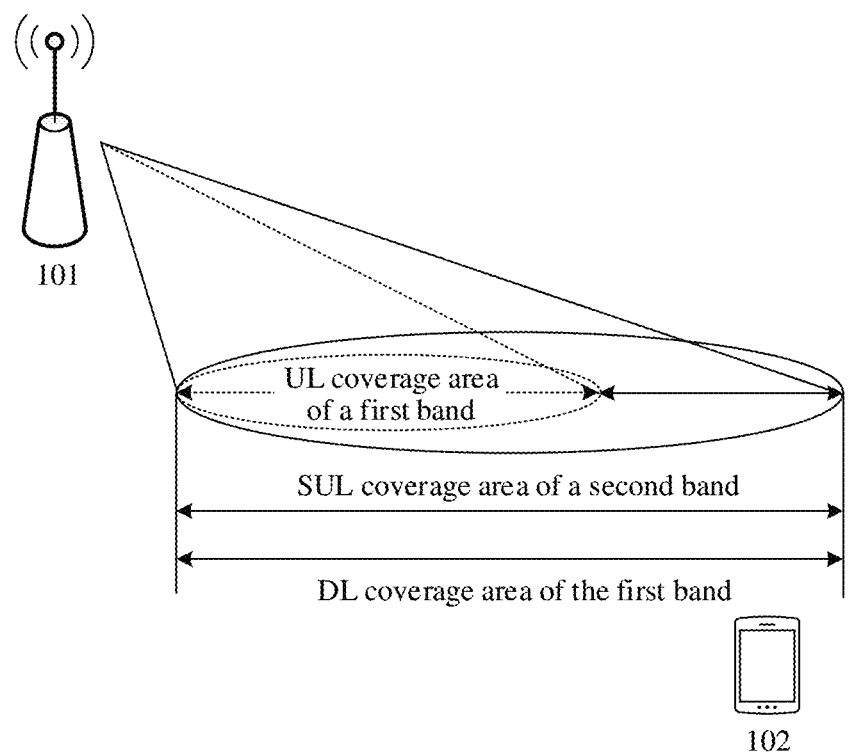
FIG. 2 is a schematic diagram of cell deployment.

FIG. 2 is a schematic diagram of cell deployment. Based on the related descriptions in the background, a process of communication between a network device 101 and a terminal 102 is used as an example. As shown in FIG. 2, in an NR cell deployment process, an NR cell may include one normal downlink (Normal downlink, NDL) carrier and one normal uplink (Normal uplink, NUL) carrier, and a band that provides an NDL and an NUL is denoted as a "first band".

With reference to FIG. 2 and the foregoing related descriptions, currently, during deployment of a cell, a downlink (downlink, DL) coverage area of the network device 101 is greater than an uplink (uplink, UL) coverage area of the network device 101, or a coverage area of the normal downlink (normal downlink, NDL) is greater than a coverage area of the normal uplink (normal uplink, NUL). Therefore, for the first band, as shown in FIG. 2, a UL coverage area of the first band is smaller than a DL coverage area of the first band.

To improve uplink coverage of a 5G cell, one or more additional SUL bands with lower frequencies may be used in addition to an original uplink frequency band of the cell. In this embodiment of this application, a band used for SUL transmission is denoted as an "SUL band" or a "first uplink carrier". It should be understood that because the SUL band is introduced and an uplink resource used for SUL transmission is provided by the SUL band, coverage in a cell edge scenario can be improved. Both the SUL band and the first band may be used for uplink transmission.

It should be further understood that an SUL band is introduced into NR, and the SUL band usually has a low frequency channel number, and therefore attenuation is small. This improves an uplink (UL) coverage area. For example, as shown in FIG. 2, the first band may be of 3.5 GHz, and the SUL band may be of 2.6 GHz; or the first band may be of 3.5 GHz, and the SUL band may be of 1.8 GHz; or the first band may be of 3.5 GHz, and the SUL band may be of 2.6 GHz and/or 1.8 GHz. A frequency band of a carrier on which the NR cell is deployed is not limited in this embodiment of this application.

In a specific implementation process, one SUL band may be associated with a TDD band or an FDD band (including an NDL/NUL). Initial access and data transmission are performed in the SUL band, so that a disadvantage that an NUL coverage area of the first band is smaller than an NDL coverage area of the first band can be compensated for. For example, uplink resources of a 1.8 GHz FDD band are matched with resources of 3.5 GHz TDD band, to provide SUL resources. In the conventional technology, the uplink resource in an FDD band of the low frequency band of 1.8 GHz or the TDD resource is defined as a dedicated SUL resource or a pure SUL resource. In this way, all slots in the SUL band are used for uplink transmission, and an uplink (UL) signal and/or an uplink channel may be transmitted in the SUL resource.

For the foregoing implementation, first, spectrum allocation by the International Telecommunication Union (International Telecommunication Union, ITU) is a long and difficult process of negotiation and definition, and interests of IMT and other fields such as radar and satellite are involved. It is difficult to mediate disputes and demands of different industries and applications. As a result, in existing spectrum planning, it is difficult to obtain dedicated SUL spectrum resources at low frequencies. Second, for a deployed TDD frequency band, for example, an LTE TDD frequency band, because the TDD band includes an NUL transmission resource, it is difficult to completely release the TDD band and use the TDD band as a dedicated SUL carrier only for uplink transmission. In addition, in existing solutions, how to process a conflict between SUL transmission and NUL transmission in the TDD band is not specified. As a result, problems related to manners of using adjacent spectrums by different operators and coexistence interference, and the like may occur. In addition, with the development of diversified 5G services, SUL carriers are used to meet both a requirement for an uplink coverage area and a requirement for uplink capacity improvement. Therefore, SUL resources besides FDD SUL resources in the conventional technology need to be provided. For example, as shown in FIG. 2, in the UL coverage area of the first band, when the terminal has a large quantity of uplink transmission requirements, the terminal may perform uplink transmission on both the first band and the SUL band, and achieve a high throughput by scheduling or occupying more uplink bands, to improve an uplink capacity.

In conclusion, how to deploy the SUL resources more effectively and flexibly and use the SUL band to improve the uplink coverage area are problems that urgently need to be resolved. Particularly, if a network operator does not have a low-frequency FDD band or a low-frequency FDD band is fully loaded, how to obtain the SUL band is a problem that urgently needs to be resolved.

It should be understood that, in existing band division, there are a plurality of low-frequency TDD bands, and the existing low-frequency TDD band deployed in LTE or NR may be multiplexed for SUL transmission. Therefore, this embodiment of this application provides a band definition rule, and the band definition rule can be used to multiplex the existing low-frequency TDD band for SUL transmission. The following describes the band definition rule in detail by using a base station as a network device and with reference to a process of interaction between the base station and a terminal.

In a possible implementation, for a definition of an SUL band, a first identifier may be introduced, and the SUL band is associated with the first identifier.

Optionally, the first identifier is different from an identifier of the TDD band multiplexed by the SUL band. For example, the first identifier may define the SUL band. In other words, the SUL band may multiplex the low-frequency TDD band for SUL transmission, and a definition identifier of the SUL band is different from a definition identifier of the existing low-frequency TDD band.

Table 1 lists a band definition specification provided in this embodiment of this application. Specifically, a plurality of bands that can be used for SUL transmission are further separately defined based on the existing TDD band. In other words, for a band in a frequency range, in addition to being defined as an original TDD band, a new identifier is defined for the SUL band. In a subsequent use process, the base station and the terminal may determine, based on different identifiers, whether a current band can be used as the first band or the SUL band.

As shown in Table 1, existing operating bands are defined as {n34, n38, n39, n40, n41, n48, n50, n51, n53, n77, n78, n79}, the foregoing bands correspond to different frequency ranges, and the frequency range includes a UL operating frequency range and a DL operating frequency range. Usually, the UL operating frequency range is the same as the DL operating frequency range.

In this embodiment of this application, a band definition is added, and is denoted as {n100, n101, n102, n103, n104, n105, n106, n107, n108, n109, n110, n111}. All bands in the set may be used for SUL transmission.

For example, for a band whose frequency range is 2496 MHz to 2690 MHz, when the frequency range is defined by using an identifier of a band n41, the band may be used for normal transmission, that is, used as the first band shown in FIG. 2, and used for NUL transmission and/or NDL transmission. Alternatively, when the frequency range is defined by using a new identifier (first identifier) n100, the band is used for SUL transmission.

It should be understood that, in this embodiment of this application, a band is defined by using different identifiers, and the identifiers mainly indicate functions of the band. For example, for the band whose frequency range is 2496 MHz to 2690 MHz, a coverage area of the band remains unchanged. When the frequency range is defined only by n41, the band may be used for NUL transmission and/or NDL transmission; or when the frequency range is defined only by n100, the band may be used for SUL transmission. Details are not described in the following descriptions.

Similarly, for a band whose frequency range is 3300 MHz to 3800 MHz, when the frequency range is defined by n77, the band may be used as the first band shown in FIG. 2, and is used for normal transmission, for example, NUL transmission and/or NDL transmission; or when the frequency range is defined by n101, the band is used as the SUL band shown in FIG. 2, and is used for SUL transmission.

Optionally, when the SUL band is selected from a plurality of bands listed in Table 1, a frequency channel number of the SUL band may be lower than a frequency channel number of the first band. For example, if the first band used for NUL transmission and/or NDL transmission is n77, the SUL band may be any one or more of {n100, n102, n103, n104, n106, n107, n108, n111}, but not any one of {n101, n105, n109, n110}.

TABLE 1

| Operating band | UL operating frequency band Frequency range ($F_{UL\_low}$-$F_{UL\_high}$) | DL operating frequency band Frequency range ($F_{DL\_low}$-$F_{DL\_high}$) | Duplex mode |
|---|---|---|---|
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |

TABLE 1-continued

| Operating band | UL operating frequency band Frequency range ($F_{UL\_low}$-$F_{UL\_high}$) | DL operating frequency band Frequency range ($F_{DL\_low}$-$F_{DL\_high}$) | Duplex mode |
| --- | --- | --- | --- |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD[1] |
| n51 | 1427 MHz-1432 MHz | 1427 MHz-1432 MHz | TDD |
| n53 | 2483.5 MHz-2495 MHz | 2483.5 MHz-2495 MHz | TDD |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n90 | 2496 MHz-2690 MHz | 2496 MHz-2690 MHz | TDD[5] |
| n100 | 2496 MHz-2690 MHz | / | SUL |
| n101 | 3300 MHz-4200 MHz | / | SUL |
| n102 | 2570 MHz-2620 MHz | / | SUL |
| n103 | 1880 MHz-1920 MHz | / | SUL |
| n104 | 2300 MHz-2400 MHz | / | SUL |
| n105 | 3550 MHz-3700 MHz | / | SUL |
| n106 | 1432 MHz-1517 MHz | / | SUL |
| n107 | 1427 MHz-1432 MHz | / | SUL |
| n108 | 2483.5 MHz-2495 MHz | / | SUL |
| n109 | 3300 MHz-3800 MHz | / | SUL |
| n110 | 4400 MHz-5000 MHz | / | SUL |
| n111 | 2496 MHz-2690 MHz | / | SUL |

In another possible definition manner, a first identifier may be a number or a remark added to an identifier of the existing TDD band, and indicates that a band including the newly added number or remark may be used as an SUL band for SUL transmission.

Specifically, Table 2 lists another band definition specification provided in this embodiment of this application. Specifically, as shown in Table 2, a superscript a is further added to a band number of the existing TDD band based on the band number of the existing TDD band, to indicate that a band including the newly added number may be used as an SUL band. For example, n34$^a$ in Table 2 indicates that all or some of uplink time domain resources of a band n134 may be used for SUL transmission.

TABLE 2

| Operating band | UL operating frequency band Frequency range ($F_{UL\_low}$-$F_{UL\_high}$) | DL operating frequency band Frequency range ($F_{DL\_low}$-$F_{DL\_high}$) | Duplex mode |
| --- | --- | --- | --- |
| n34$^a$ | 2010 MHz-2025 MHz | | SUL |
| n38$^a$ | 2570 MHz-2620 MHz | | SUL |
| n39$^a$ | 1880 MHz-1920 MHz | | SUL |
| n40$^a$ | 2300 MHz-2400 MHz | | SUL |
| n41$^a$ | 2496 MHz-2690 MHz | | SUL |
| n48$^a$ | 3550 MHz-3700 MHz | | SUL |
| n50$^a$ | 1432 MHz-1517 MHz | | SUL |
| n51$^a$ | 1427 MHz-1432 MHz | | SUL |
| n53$^a$ | 2483.5 MHz-2495 MHz | | SUL |
| n77$^a$ | 3300 MHz-4200 MHz | | SUL |
| n78$^a$ | 3300 MHz-3800 MHz | | SUL |
| n79$^a$ | 4400 MHz-5000 MHz | | SUL |
| n90$^a$ | 2496 MHz-2690 MHz | | SUL |

In another possible implementation, the first identifier may further defines a band combination, and the band combination is a band combination of at least one SUL band and at least one TDD band.

Specifically, when the SUL band multiplexes a low-frequency TDD band, in addition to the separately defined SUL bands described in Table 1 and Table 2, a combination of bands having an association relationship may be defined, that is, the TDD band and the SUL band are jointly defined. In other words, the first band and the SUL band are jointly defined.

Specifically, the TDD band and the SUL band may be separately defined, and then are jointly defined. Table 3 lists still another band definition specification provided in this embodiment of this application. Specifically, an operating band and the SUL band are jointly defined based on the existing TDD band.

For example, as shown in Table 3, a definition rule SUL_na-nb is provided, where na indicates the first band, that is, a normal operating band. Specifically, nb indicates an SUL band that may be associated for SUL transmission when the first band is na.

Optionally, a value range of na is {n34, n38, n39, n40, n41, n48, n50, n51, n53, n77, n78, n79}, and a value range of nb is {n100, n101, n102, n103, n104, n105, n106, n107, n108, n109, n110, n111}. Alternatively, na and nb are any two different bands in {n34, n38, n39, n40, n41, n48, n50, n51, n53, n77, n78, n79}.

Optionally, for the definition rule listed in Table 3, if a frequency channel number of na is higher than a frequency channel number of nb, it can be ensured that a frequency channel number of the SUL band is lower than a frequency channel number of the first band, and coverage area of the SUL band with the lower frequency channel number can be larger.

For example, for a band combination SUL_n78-n100, n78 is a band na, that is, is used as a first band for normal uplink transmission, and n100 is a band nb, that is, is used as an SUL band for SUL transmission. In the band combination in this embodiment, nb that can be associated with the first band na is a newly defined SUL band.

Alternatively, in the band combination, nb that can be associated with the first band na is an identifier in the TDD band. For example, for a band combination SUL_n41-n80, n41 is a band na, that is, is used as a first band for normal uplink transmission, and n80 is a band nb, that is, is used as an SUL band for SUL transmission. In some embodiments, a frequency channel number of n41 is higher than a frequency channel number of n80.

TABLE 3

| Band combination | NR band |
| --- | --- |
| SUL_n78-n100 | n78, n100 |
| SUL_n79-n101 | n79, n101 |
| SUL_na-nb | na, nb |

According to the band combination definition method described in Table 3, if both NUL/NDL transmission and SUL transmission in a TDD band are supported on a system side, the existing TDD band and the SUL band may jointly defined, and a corresponding band combination definition is extended to the SUL band used for SUL transmission. The definition method is simple and easy to implement, and band coexistence evaluation, research, and the like do not need to be repeatedly performed.

In still another possible implementation, a plurality of SUL bands may be configured for one normal operating band. In other words, a plurality of SUL bands may be configured for one first band. In a scenario in which a plurality of SUL bands are configured for one band, the plurality of SUL bands may be further defined in a band combination. In other words, a first band and the plurality of SUL bands are jointly defined.

Specifically, the TDD band and the SUL band may be separately defined, and then are jointly defined. Table 4 lists yet another band definition specification provided in this embodiment of this application. Specifically, an operating band and a plurality of SUL bands are jointly defined based on the existing TDD band.

For example, Table 4 lists yet another band definition specification provided in this embodiment of this application. As shown in Table 4, a definition rule SUL_na-nb-nc is provided, where na indicates a first band, that is, an operating band, and nb and nc indicate at least two SUL bands that may be associated when the first band is na.

Optionally, for the definition rule SUL_na-nb-nc provided in Table 4, a value range of na is {n34, n38, n39, n40, n41, n48, n50, n51, n53, n77, n78, n79}, a value range of nb is {n80, n81, n82, n83, n84, n86, n89, n100, n101, n102, n103, n104, n105, n106, n107, n108, n109, n110, n111}, and a value range of nc is {n80, n81, n82, n83, n84, n86, n89, n100, n101, n102, n103, n104, n105, n106, n107, n108, n109, n110, n111}.

TABLE 4

| Band combination | NR band |
| --- | --- |
| SUL_n41-n80-n100 | n41, n80, n100 |
| SUL_n41-n81-n100 | n41, n81, n100 |
| SUL_na-nb-nc | na, nb, nc |

Optionally, for the definition rule listed in Table 4, a frequency channel number of na is higher than frequency channel numbers of nb and nc, and band numbers of nb and nc are different. In other words, it is ensured that a frequency channel number of the SUL band is lower than a frequency channel number of the first band. For example, for a band combination SUL_n41-n80-n100, when the first band is n41, the SUL band may multiplex n80 and n100 for SUL transmission. For a band combination SUL_n41-n81-n100, when the first band is n41, the SUL band may multiplex n81 and n100 for SUL transmission. Details are not described herein.

It should be further understood that the foregoing definition rule SUL_na-nb-nc may be a relationship between one DL band and two SUL bands, and similarly, a band combination of one DL band and a plurality of SUL bands may be configured according to the definition rule.

For example, Table 5 lists still yet another band definition specification provided in this embodiment of this application. Specifically, an operating band and a plurality of SUL bands are jointly defined based on the existing TDD band. For a definition rule SUL_na-nb-nc-nd in Table 5, any one band in na, nb, nc, and nd may be used as an SUL band of other bands, and band numbers of na, nb, nc, and nd are different.

For example, for a band combination SUL_n41-n80-n100-n101, n41 and n80 are used as first bands for normal uplink transmission, and n100 and n101 may be used as SUL bands for SUL transmission. In the band combination in this embodiment, the first band may be associated with a newly defined SUL band. Alternatively, na, nb, nc, and nd are all selected from different bands in existing {n34, n38, n39, n40, n41, n48, n50, n51, n53, n77, n78, n79}. This is not limited in this embodiment of this application.

Optionally, for the foregoing band combination definition, a frequency channel number of a band used for SUL transmission may be lower than a frequency channel number of a band used for NDL/NUL transmission. For example, for the band combination SUL_na-nb-nc-nd, a frequency channel number of na is lower than frequency channel numbers of nb, nc, and nd, band numbers of nb, nc, and nd are different, and na may be used as an SUL band of nb, nc, and nd, to implement supplementary uplink. Details are not described herein.

TABLE 5

| Band combination | NR band |
| --- | --- |
| SUL_n41-n80-n100-n101 | n41, n80, n100, n101 |
| SUL_n41-n81-n100-n104 | n41, n81, n100, n104 |
| SUL_na-nb-nc-nd | na, nb, nc, nd |

According to the band or band combination definition rules described in Table 1 to Table 5, if both NUL/NDL transmission and SUL transmission in a TDD band are supported on the system side, the existing TDD band and at least one SUL band are jointly defined. Compared with introducing a new band definition, the definition may indicate a band that can be used for SUL transmission for the base station and the terminal. The definition method is simple and easy to implement, and band coexistence evaluation, research, and the like do not need to be repeatedly performed.

It should be understood that, in the band definition rules described in Table 1 to Table 5, the SUL band may multiplex the existing TDD band, and the frequency channel number of the SUL band is lower than a frequency channel number of a TDD band used for normal transmission, or the SUL band may multiplex a band with a high frequency channel number of another user equipment. This falls within the protection scope of this application.

It should be further understood that, in this embodiment of this application, using a band as an SUL band may be that all or some of uplink time domain resources of the band are used for SUL transmission, in other words, an uplink signal/channel is sent to a network device. This is not limited in this embodiment of this application.

In a possible implementation, for the SUL band, in a process of configuring a time domain resource of the SUL band, a slot and/or a symbol used by the SUL band are/is configured as a subset of uplink slots and/or symbols and flexible slots and/or symbols to which a band multiplexed by the SUL band belongs. Alternatively, a slot and/or a symbol used by the SUL band are/is configured as a subset of uplink slots and/or symbols or flexible slots and/or symbols to which a band multiplexed by the SUL band belongs.

It should be understood that the subset herein may include same resources. In other words, the time domain resource of the SUL band may be configured according to a slot configuration rule and/or a symbol configuration rule of the multiplexed TDD band. A time domain resource configuration method and rule of the SUL band are not limited in this embodiment of this application.

In still another possible implementation, the first identifier is the same as an identifier of the TDD band multiplexed by the SUL band, the first identifier further includes first indication information, and the first indication information indicates whether the TDD band multiplexed by the SUL band is used for SUL transmission.

Specifically, in addition to the plurality of independently defined SUL bands described above, only a TDD band may be defined according to the existing solution, and whether the TDD band is used for SUL transmission may be marked. Alternatively, a TDD band combination is defined, and whether the TDD band combination is used for SUL transmission may be marked.

Specifically, in the TDD bands {n34, n38, n39, n40, n41, n48, n50, n51, n53, n77, n78, n79} listed in Table 1, if a TDD band is used for SUL transmission in the band, an SUL band is no defined for the TDD band, and whether the TDD band is used for SUL transmission may be indicated by the first indication information.

Optionally, a location of the SUL band may be indicated by a broadcast message. In other words, related SUL information is indicated by an NDL carrier of the TDD associated with the SUL band.

Alternatively, optionally, the first indication information may indicate, in the TDD band, that the TDD band is also used for SUL transmission. For example, if the terminal communicates with the base station in the TDD band, reporting of a terminal capability or auxiliary information may be triggered according to an indication that is included in the TDD band and that is used for SUL transmission, so that the base station can determine whether to switch the terminal to SUL transmission corresponding to the TDD band.

Similarly, a TDD band combination may be defined, and whether the TDD band combination is used for SUL transmission may be further marked, or may be supported by defining an SUL band combination.

For example, Table 6 is a further band definition specification provided in this embodiment of this application. As shown in Table 6, in the definition, a carrier aggregation (carrier aggregation, CA) band combination CA_n39-n41 indicates that a band n39 or n41 is used for SUL transmission.

TABLE 6

| Band combination | NR band |
| --- | --- |
| CA_n38-n66 | n38, n66 |
| CA_n39-n40 | n39, n40 |
| CA_n39-n41 | n39, n41 |
| CA_n39-n79 | n39, n79 |
| ... | ... |

In yet another possible implementation, the definition manner in Table 6 may be similar to the definition manner listed in Table 2. To be specific, a superscript a is added to a band number of a TDD band based on a band combination, to indicate that the band including the newly added number may be used as the SUL band. For example, Table 7 is a still further band definition specification provided in this embodiment of this application. As shown in the following Table 7, CA_n39-n79$^a$ indicates that n79 may be used as an SUL band. In other words, all or some of uplink time domain resources of n79 are used for SUL transmission.

TABLE 7

| Band combination | NR band |
| --- | --- |
| CA_n38-n66$^a$ | n38, n66 |
| CA_n39-n40$^a$ | n39, n40 |
| CA_n39-n41$^a$ | n39, n41 |
| CA_n39-n79$^a$ | n39, n79 |
| ... | ... |

Alternatively, for example, Table 8 is a yet further band definition specification provided in this embodiment of this application. As shown in Table 8, in a band combination CA_n39-n41-n79$^a$, a superscript of a band is further added as first indication information, to indicate that the band including the superscript is used for SUL transmission. For example, in the band combination CA_n39-n41-n79$^a$, n79$^a$ may be used for SUL transmission.

TABLE 8

| Band combination | NR band |
| --- | --- |
| CA_n39-n41-n79$^a$ | n39, n41, n79 |
| CA_n40-n41-n79$^a$ | n40, n41, n79 |
| CA_n41-n66-n71$^a$ | n41, n66, n71 |
| CA_n66-n70-n71$^a$ | n66, n70, n71 |
| ... | ... |

In still yet another possible implementation, for the definition manner in Table 7 or Table 8, numbers or remarks may be added to a plurality of TDD bands based on a band combination, to indicate that the plurality of bands including the added numbers or remarks may be used as SUL bands for SUL transmission.

For example, Table 9 is a still yet band definition specification provided in this embodiment of this application. As shown in Table 9, in a band combination CA_n39-n41a-n79$^a$, numbers or remarks are further added to n41 and n79, to indicate that n41 and n79 can be used for SUL transmission.

TABLE 9

| Band combination | NR band |
| --- | --- |
| CA_n39-n41$^a$-n79$^a$ | n39, n41, n79 |
| CA_n40-n41$^a$-n79$^a$ | n40, n41, n79 |
| CA_n41-n66$^a$-n71$^a$ | n41, n66, n71 |
| CA_n66-n70$^a$-n71$^a$ | n66, n70, n71 |
| . . . | . . . |

Alternatively, for example, Table 10 is even yet band definition specification provided in this embodiment of this application. As shown in Table 10, a band combination CA_n39-n41-n78-n79 further indicates, by using first indication information, that one or more bands in the band combination are used for SUL transmission. The first indication information may be different from the superscript or the like described above, and directly indicates to the terminal device that the last band n79 in the band combination may be used for SUL transmission. In other words, all or some of uplink time domain resources of n79 may be used for SUL transmission.

TABLE 10

| NR band combination | NR band |
| --- | --- |
| CA_n1-n3-n8-n78 | n1, n3, n8, n78 |
| CA_n1-n3-n28-n78 | n1, n3, n28, n78 |
| CA_n39-n41-n78-n79 | n39, n41, n78, n79 |
| . . . | . . . |

Alternatively, the band combination CA_n39-n41-n78-n79 in Table 10 further indicates, by using first indication information, that all bands in the band combination can be used for SUL transmission. The first indication information directly indicates to the terminal device that all of bands n39, n41, n78, and n79 in the band combination can be used for SUL transmission. In other words, all or some of uplink time domain resources of n39, n41, n78, and n79 can be used for SUL transmission. In this embodiment, any one of n39, n41, n78, and n79 may be used as a supplementary transmission band of other bands. Details are not described herein.

TABLE 11

| Band combination | NR band |
| --- | --- |
| CA_n1-n3-n8-n78 | n1, n3, n8, n78 |
| CA_n1-n3-n28-n78 | n1, n3, n28, n78 |
| CA_n39-n41-n78-n79$^a$ | n39, n41, n78, n79 |
| . . . | . . . |

According to the band definition rules and the band combination definition rules described in Table 6 to Table 10, the first indication information is added to the existing TDD band, so that whether the band is used for SUL transmission is indicated by using the first indication information, or whether the band combination is used for SUL transmission is defined in a TDD band combination. An indication manner is simple and clear. Specifically, in a process of communication between the base station and the terminal, the terminal may quickly specify a location of a SUL resource in the TDD band based on a current TDD band or TDD band combination and indication information that is included in the TDD band or the TDD band combination and that is used for SUL transmission, and the base station does not need to indicate the SUL resource by using other additional indication information. This simplifies a communication procedure and reduces signaling overheads.

Optionally, the possible first indication information listed above may be predefined information. For example, the first indication information is already defined in a standard, and the base station and the terminal may clearly determine, based on the first indication information, a band used for SUL transmission.

Optionally, the first indication information may be sent by the base station to the terminal, and the terminal determines, based on the first indication information, a band used for SUL transmission.

Alternatively, the base station may indicate, in an explicit manner or an implicit manner, a band used for SUL transmission.

For example, if the SUL band multiplexes an original identifier of the TDD band, in an implementation process, a superscript or a comment may be added to the original identifier of the TDD band, and the terminal is further notified, in configuration information of a system message SIB, that the added superscript or comment indicates that the TDD band is used for SUL transmission.

Alternatively, at least one TDD band is associated in an explicit manner by using the configuration information of the SIB, to indicate that the at least one TDD band is used for SUL transmission.

Alternatively, a TDD band is configured in an implicit manner for SUL transmission by using the configuration information of the SIB, for example, in a manner of configuring an SUL PRACH resource, an SUL time-frequency resource subset, or feature information of the SUL band for the terminal. A manner of indicating, in the explicit manner or the implicit manner, that the TDD band is used for SUL transmission is not limited in this embodiment of this application.

When the first indication information indicates that the multiplexed TDD band is used for SUL transmission, to implement uplink transmission between the base station and the terminal in the SUL band, the terminal needs to report capability information of the terminal to the base station.

Optionally, the capability information reported by the terminal includes the first identifier; or the capability information indicates that user equipment is used for uplink transmission, downlink transmission, and/or sidelink transmission in a TDD band in which a first uplink carrier is located; or the capability information indicates that user equipment is not used for SUL transmission in a TDD band in which a first uplink carrier is located; or the capability information indicates that user equipment supports both TDD transmission and SUL transmission, and a priority of a capability of performing SUL transmission by the user equipment is lower than a priority of a capability of performing TDD transmission by the user equipment.

It should be understood that sidelink transmission herein may be understood as a "sidelink", and the sidelink may be applied to a scenario in which there is no network coverage, a scenario in which devices communicate with each other, or the like. Specifically, for a manner of transmitting signals/channels in different scenarios, refer to the SUL transmission manner provided in this embodiment of this application. Details are not described herein again. It should be understood that different types of terminals may have different capabilities. For example, some terminals support SUL transmission, and some terminals do not support SUL transmission. In this embodiment of this application, different terminals may be further defined as three different types based on different capabilities of the terminals. The base station may configure different SUL resources for different terminals based on capabilities of the terminals in different bands, and different types of terminals correspond to different SUL transmission processes.

Specifically, the following four scenarios may be included.

Terminal Type 1

In a possible case, a terminal of a first type supports only SUL transmission. In other words, the terminal has only a transmit capability in a TDD band, and supports uplink (uplink) transmission and/or sidelink (sidelink) transmission.

Capability information of the terminal of the first type may be defined. The capability information indicates that the terminal of the first type supports only SUL transmission in both an initial access phase and a data transmission phase, so that an accessed RACH resource does not need to be selected from an SUL and an NUL.

Optionally, that a band number of an SUL band corresponds to a capability of the terminal of the first type may be separately defined; or that the terminal of the first type supports SUL transmission may be further limited, by using a TDD band; or that the terminal of the first type supports SUL transmission may be further limited, by using a TDD band combination.

Optionally, the capability information of the terminal may be indicated in a broadcast message, or may be preconfigured before delivery of the terminal. This is not limited in this embodiment of this application.

Terminal Type 2

In another possible case, a terminal of a second type supports receiving and sending operations in a TDD band. In other words, the terminal has a receiving capability and a transmitting capability in the TDD band, and supports uplink (uplink) transmission, downlink transmission, sidelink (sidelink) transmission, and/or the like.

Capability information of the terminal of the second type may be defined, and the capability information indicates whether the terminal supports SUL transmission in the TDD band.

Optionally, when the terminal supports SUL transmission in the TDD band, the base station may configure indication information of an SUL resource for the terminal in the TDD band, including an SUL resource used for initial access and/or an SUL resource used in a data transmission process.

Alternatively, when the terminal does not support SUL transmission in the TDD band, the base station does not configure indication information of an SUL resource for the terminal in the TDD band, especially an SUL resource used in a data transmission process. Specifically, the base station may separately define a capability of the terminal corresponding to an SUL band, or may define the capability of the terminal in the TDD band, to further limit an SUL transmission process.

Terminal Type 3

In still another possible case, a terminal of a third type supports only receiving and sending operations in a TDD band. In other words, the terminal does not support SUL transmission in the TDD band.

The base station does not need to configure indication information of an SUL resource for the terminal of the third type, especially an SUL resource used in a data transmission process.

Alternatively, after the base station configures an RACH resource used for SUL transmission in the TDD band, the terminal performs RACH access only in an NUL and does not perform RACH access in an SUL based on receiving and sending capabilities in the TDD band supported by the terminal.

Terminal Type 4

In yet another possible case, a terminal of a fourth type supports receiving and sending operations in a TDD band. In other words, the terminal has a receiving capability and a transmitting capability in the TDD band, and supports uplink (uplink) transmission, downlink transmission, sidelink (sidelink) transmission, and/or the like.

Capability information of the terminal of the second type may be defined, and the capability information indicates whether the terminal supports SUL transmission in the TDD band. Further, the capability information may define levels of a priority of a capability of performing SUL transmission by the terminal of the fourth type and a priority of a capability of performing TDD transmission by the terminal of the fourth type.

Optionally, the priority of the capability of performing SUL transmission by the terminal is lower than the priority of the capability of performing TDD transmission by the terminal.

It should be understood that in the foregoing definition scenarios, a heavily loaded 4G network of an operator, for example, China Mobile, will reduce a 4G load with the evolution of 5G, to gradually release UL resources on the 4G network. However, to avoid an impact on UL scheduling of the original 4G network, the priority of the capability of performing SUL transmission by the terminal is lower than the priority of the capability of performing TDD transmission by the terminal, so that idle UL resources of the original TDD network can be used. Optionally, the type and the capability information of the terminal may be defined in each TDD band or indicated by using information, or the capability of the terminal may be updated based on a status of the terminal or based on a change of a scenario in which the terminal is located. This is not limited in this embodiment of this application.

According to the foregoing solution, that the different types of terminals correspond to different SUL transmission processes is defined based on different types of terminals. In this way, in the process of communication between the terminal and the base station, the base station can perform different scheduling based on types and capabilities of different terminals, so that terminals with different capabilities can perform different SUL transmission processes. This improves accuracy of a transmission process and reduces signaling overheads.

It should be understood that, in this embodiment of this application, the base station may learn of a type or capability information of the terminal in a plurality of possible manners.

Optionally, when accessing the base station, the terminal may report the capability information to the base station. For example, the terminal transmits a signaling message 3 (Msg3) on a PUSCH allocated by the base station, and uses the signaling message 3 to carry the capability information of the terminal, to report, to the base station, whether the terminal supports SUL transmission.

Alternatively, when configuring an SUL for the terminal, the base station notifies the terminal of a terminal type supported by the base station, so that the terminal can select an access manner or an operating manner of an SUL resource based on the type of the terminal. This is not limited in this embodiment of this application.

The foregoing describes a possible band definition rule or a band combination definition rule provided in embodiments of this application, and describes terminals with different capabilities. In addition, different SUL transmission processes may be provided for the terminals with different capabilities. Therefore, an embodiment of this application further provides a method for determining an SUL band. The following describes, with reference to a process of interaction between a base station and a terminal, the method for determining an SUL band provided in this embodiment of this application.

Optionally, the terminal may include devices operating in different modes, for example, first user equipment (UE 1) operating in an NR scenario and second user equipment (UE 2) operating in an LTE scenario. Alternatively, both the UE 1 and the UE 2 may support a terminal in the NR scenario, that is, a scenario in which the UE 1 and the UE 2 in NR multiplex an operating band of each other for SUL transmission. Alternatively, both the UE 1 and the UE 2 may support a terminal in the LTE scenario, or the like. It should be understood that the UE 1 and the UE 2 may support at least one of a plurality of scenarios such as the NR scenario and the LTE scenario. This is not limited in this embodiment of this application.

Figure 3:
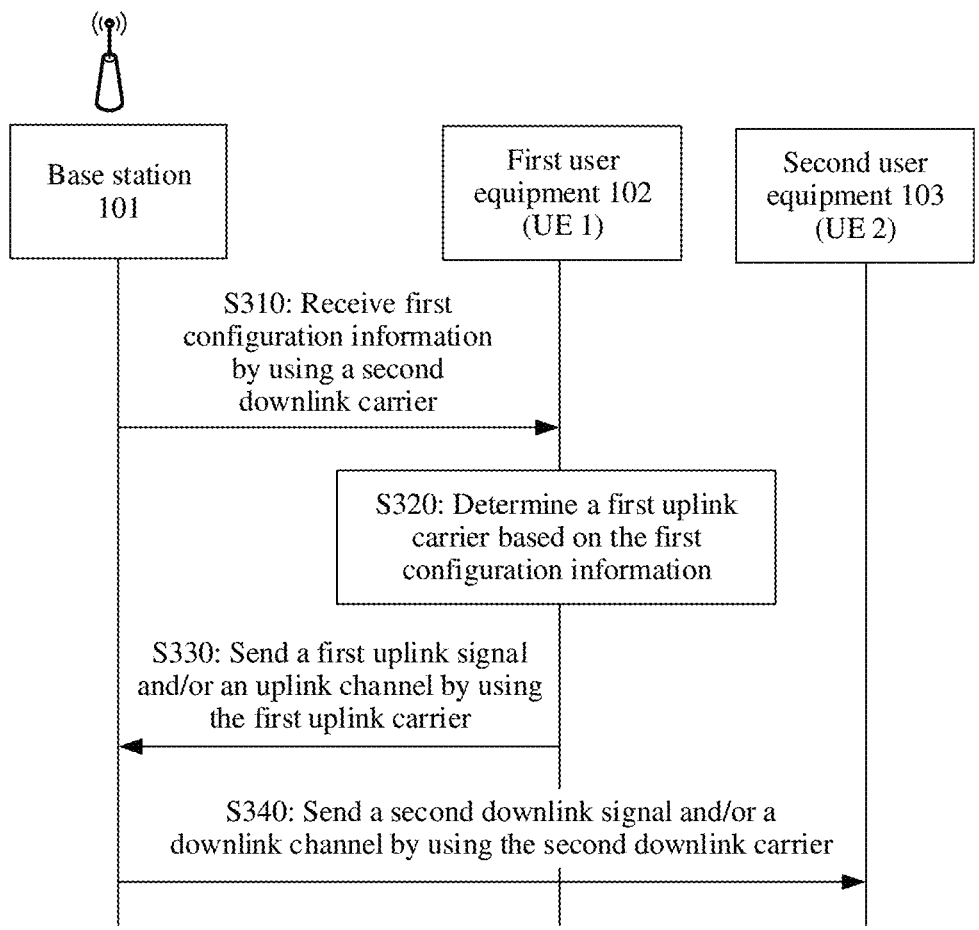
FIG. 3 is a schematic interaction diagram of a method for determining an SUL band according to an embodiment of this application.

FIG. 3 is a schematic interaction diagram of a method 300 for determining an SUL band according to an embodiment of this application. The method 300 may be applied to a terminal or a base station in the foregoing wireless communication system 100. As shown in FIG. 3, the method 300 includes the following steps.

S310: A base station 101 sends first configuration information to first user equipment 102 by using a second downlink carrier. Correspondingly, the first user equipment 102 receives the first configuration information by using the second downlink carrier.

The first configuration information indicates configuration information of a first uplink carrier, and the configuration information of the first uplink carrier includes slot and/or symbol configuration information indicating supplementary uplink SUL transmission.

It should be understood that bands in which a second uplink carrier and the second downlink carrier corresponding to the second uplink carrier are located each are a TDD band or an FDD band used for uplink transmission and downlink transmission, and the first uplink carrier is a band used for SUL transmission. In other words, the first uplink carrier is an "SUL band" in this embodiment of this application, and the second uplink carrier is a first band used for NDL and/or NUL transmission in this embodiment of this application.

Optionally, a frequency channel number of a band in which the first uplink carrier is located is different from a frequency channel number of the band in which the second uplink carrier is located, and the first uplink carrier and the second downlink carrier belong to a same cell.

In a possible implementation, the base station 101 may determine, for the first user equipment 102, a TDD band used for SUL transmission.

Optionally, the TDD band may include a location of the TDD band, that is, include a frequency domain location, a time domain location, and the like of the TDD band.

Specifically, the base station may determine, for the first user equipment 102, the TDD band used for SUL transmission in a plurality of manners. For example, for the different band definition rules and scenarios described in Table 1 to Table 11, the base station determines, for the first user equipment 102, the TDD band that can be currently used for SUL transmission. For example, the band currently that can be currently used for SUL transmission is determined based on the first identifier described above.

For example, for the TDD band definition specification listed in Table 1, it is determined, in a current NR band, that one or more bands in {n100, n101, n102, n103, n104, n105, n106, n107, n108, n109, n110 and n111} are TDD bands used for SUL transmission.

Alternatively, for example, for the TDD band definition specification listed in Table 2, it is determined, in a current operating band, that a TDD band whose TDD band identifier includes a number or a remark is a TDD band used for SUL transmission. For example, $n34^a$, $n38^a$, $n39^a$, $n40^a$, and the like listed in Table 2 are TDD bands used for SUL transmission.

Alternatively, for example, for the TDD band definition specifications listed in Table 3 to Table 5, a TDD band used for SUL transmission is determined from a plurality of bands that are defined as a band combination, for example, SUL_n78-n100 and SUL_n79-n101 listed in Table 3.

Alternatively, for example, for the TDD band definition specifications listed in Table 6 and Table 7, a TDD band used for SUL transmission is determined from current NR bands. For example, it is determined from CA_n38-n79 listed in Table 6 that n38 and/or n79 may be used for SUL transmission; or it is determined from CA_n39-$n79^a$ listed in Table 7 that n79 may be used for SUL transmission; or CA_n39-n41-n79 listed in Table 8 may indicate that n39 and/or n41 and/or n78 are/is used for SUL transmission.

In conclusion, if an SUL band multiplexes an original identifier of the TDD band, in an implementation process, a superscript or a comment may be added to the original identifier of the TDD band, and the terminal is further notified, in configuration information of a system message SIB, that the added superscript or comment indicates that the TDD band is used for SUL transmission.

Alternatively, at least one TDD band is associated in an explicit manner by using the configuration information of the SIB, to indicate that the at least one TDD band is used for SUL transmission.

Alternatively, the configuration information of the SIB indicates, in an implicit manner, that a TDD band is used for SUL transmission, for example, in a manner of configuring an SUL PRACH resource, an SUL time-frequency resource subset, or feature information of the SUL band for the terminal. A manner of indicating, by using explicit indication information or implicit indication information, that the TDD band is used for SUL transmission is not limited in this embodiment of this application. According to the foregoing examples, the base station 101 may determine, from a plurality of TDD bands in various possible band definition manners, one or more TDD bands used by the first user equipment 102 to perform SUL transmission.

It should be understood that one or more TDD bands may be used as an SUL band. In other words, in this embodiment of this application, the one or more TDD bands are collectively referred to as an "SUL band". The SUL band may include one or more TDD bands used for SUL transmission. Details are not described subsequently.

In another possible implementation, the first configuration information may be band indication information sent by the base station 101 to the first user equipment 102, and the band indication information indicates the TDD band used by the first user equipment 102 to perform SUL transmission. Correspondingly, the first user equipment 102 may determine, based on the received band indication information, a location of the SUL band used for SUL transmission.

Optionally, in this embodiment of this application, the base station 101 may provide an NR cell for the first user equipment 102 for access. In other words, the first user equipment 102 may communicate with the base station 101 in a band of a high frequency band. In addition, the base station 101 may further provide an LTE cell for the second user equipment 103 for access. In other words, the second user equipment 103 may communicate with the base station 101 in a band of a low frequency band.

With reference to FIG. 2, it can be learned that the first band is a normal TDD band, and is used to provide, for the first user equipment 102, a band used for NDL transmission and NUL transmission. The SUL band is a band used to support the first user equipment 102 in performing SUL transmission. For example, the SUL band is a TDD band with a low frequency channel number. Therefore, both the first band and the SUL band may be used by the first user equipment 102 to perform uplink transmission.

In still another possible implementation, the base station 101 may send a downlink (DL) signal and/or a downlink channel to the first user equipment 102 in the first band. The downlink signal includes band indication information, and the band indication information indicates a location of the SUL band used for SUL transmission.

Alternatively, the base station 101 sends a broadcast message in the first band. The broadcast message includes band indication information, and the band indication information indicates a location of the SUL band used for SUL transmission.

S320: The first user equipment 102 determines the first uplink carrier based on the first configuration information.

S330: The first user equipment 102 sends a first uplink signal and/or an uplink channel to the base station 102 by using the first uplink carrier.

In addition, the method further includes S340: The base station 101 sends a second downlink signal and/or a downlink channel to the second user equipment 103 by using the second downlink carrier.

Optionally, S340 may be performed by the base station 101 to determine, for the second user equipment 103, a location of the first band used for NUL transmission and NDL transmission.

It should be understood that, in this embodiment of this application, the first user equipment 102 may multiplex a TDD band of a low frequency band, and it needs to be ensured that a scenario in which the TDD band of the low frequency band is used as an operating band of the second user equipment 103 is not affected, to implement NUL and NDL transmission processes of the second user equipment 103. Therefore, after determining the SUL band, the base station 101 may determine the location of the first band that is allocated to the second user equipment 103 and that is used for NUL transmission and NDL transmission. A manner in which the base station 101 determines the first band for the second user equipment 103 is not limited in this embodiment of this application.

In a possible implementation, the base station 101 may send second indication information to the second user equipment 103. The second indication information indicates the location of the first band used for NUL transmission and NDL transmission. Correspondingly, the second user equipment 103 may determine locations of an allocated uplink resource and an allocated downlink resource based on the received second indication information.

Specifically, the base station 101 may notify, by using the second indication information, the second user equipment 103 of a range of the allocated uplink resource and a range of the allocated downlink resource, to support receiving or sending of an uplink signal and a downlink signal of the second user equipment 103.

In another possible implementation, the base station 101 allocates the SUL band to the first user equipment 102 as the first uplink carrier.

Optionally, with reference to the information about the SUL band determined for the first user equipment 102 in S31o and the information about the first band determined for the second user equipment 103 in S330, the base station 101 may allocate an available SUL resource from the SUL band to the first user equipment 102 in a case in which SUL transmission of the first user equipment 102 and the base station 101 is not affected, and NUL transmission and NDL transmission of the second user equipment 103 and the base station 101 is not affected.

It should be understood that, in this embodiment of this application, for a TDD band used for SUL transmission and a normal TDD band (the first band) associated with the TDD band, the first user equipment 102 may find a cell in the first band, and obtain system information of the cell, to obtain an initially accessed uplink random access channel (random access channel, RACH) resource, including related configuration information such as an RACH resource on an NUL and an RACH resource on an SUL.

Further, the first user equipment 102 may determine, based on a reference signal received power (reference signal received power, RSRP) and the like in the first band, a process in which a carrier initiates an RACH, to perform an initial access procedure. Specifically, when the RSRP is less than a specific threshold, the first user equipment 102 performs random access by using the RACH resource on the SUL. When the RSRP is greater than the specific threshold, the first user equipment 102 performs random access by using the RACH resource on the NUL.

In a possible implementation, when the base station 101 allocates the RACH resource on the SUL to the first user equipment 102, the base station 101 may allocate the RACH resource to a UL symbol or a flexible (flexible) symbol in a TDD band in which the SUL is located, to avoid a conflict with a DL symbol of the TDD band.

In another possible implementation, to avoid a conversion problem between signal receiving and signal sending by the first user equipment 102, a symbol of the RACH resource cannot occupy one flexible symbol immediately following the DL symbol of the TDD band, so that the base station 101 can perform mode conversion between signal receiving and signal sending in a time of one symbol.

Optionally, the base station 101 may send third indication information to the first user equipment 102, where the third indication information indicates the SUL band. Correspondingly, the first user equipment 102 may determine, based on the third indication information, the SUL band that can currently be used for SUL transmission.

It should be understood that, in this embodiment of this application, the base station 101 may first determine the location of the first band used for NUL transmission and NDL transmission for the second user equipment 103, to perform S340, and then determine the band used for SUL transmission for the first user equipment 102. This is not limited in this embodiment of this application. After entering an RRC connected mode, the first user equipment 102 may transmit a corresponding uplink signal, for example, transmit a UL signal and/or send a PUCCH/PUSCH, on an NUL/SUL resource based on the SUL resource configured by the base station 101 and/or dynamic scheduling indication information sent by the base station 101.

The base station 101 is used for normal transmission such as NUL transmission and NDL transmission in the TDD band used for SUL transmission. In other words, in the SUL band used for SUL transmission, the base station 101 may receive and/or send an uplink signal/channel and/or a downlink signal/channel of the second user equipment 103, so that the first user equipment 102 and the second user equipment 103 can implement multiplexing and resource sharing in the TDD band used for SUL transmission.

For the first user equipment 102, the base station 101 configures all or some UL/flexible symbols/slots as an SUL resource for the first user equipment 102 in the TDD band used for SUL transmission, to support SUL transmission of the first user equipment 102. The first user equipment 102 may transmit an uplink signal/channel in the configured SUL resource.

Optionally, the third indication information may be understood as configuration information, and the configuration information may include a time domain range of the SUL resource. For example, the configuration information may indicate a resource range starting from the $j^{th}$ symbol of the $n^{th}$ slot to the $k^{th}$ symbol of the m slot. Correspondingly, the first user equipment 102 may learn of the resource range starting from the $j^{th}$ symbol of the $n^{th}$ slot to the $k^{th}$ symbol of the $m^{th}$ slot based on the configuration information.

In S330, the first user equipment 102 sends the first uplink signal/uplink channel to the base station 101 by using the determined SUL band. Correspondingly, the base station 101 receives, by using the determined SUL band, the first uplink signal and/or the uplink channel sent by the first user equipment 102.

Optionally, the base station 101 notifies the first user equipment 102 of the allocated SUL band by using the third indication information, to support the first user equipment 102 in sending the first uplink signal or the channel in an SUL mode.

In addition, it should be further understood that the base station 101 may further receive, by using another band, a second uplink signal and/or uplink channel sent by the second user equipment 103. The another band is a TDD band or an FDD band used for uplink transmission and downlink transmission, a frequency channel number of the SUL band is different from a frequency channel number of the another band, and the SUL band and the another band belong to a same cell.

In this embodiment of this application, according to the method for determining an SUL band described in S310 to S340, differentiation is performed during resource scheduling and allocation by the base station 101, so that the SUL resource of the first user equipment 102 and an NUL resource and an NDL resource of the second user equipment 103 do not interfere with each other, and the first user equipment 102 can perform SUL transmission in the TDD band to send an uplink signal/channel, without affecting receiving and sending of an uplink/downlink signal/channel of the second user equipment 103. In this way, transmission efficiency is improved.

The foregoing describes a case in which the first user equipment 102 multiplexes a TDD band of the second user equipment 103 to perform SUL transmission. Similarly, an embodiment of this application further provides a communication system. The communication system includes the first user equipment 102 and the second user equipment 103. The first user equipment 102 may multiplex a TDD band of the second user equipment 103 to perform SUL transmission, and the second user equipment 103 may multiplex a TDD band of the first user equipment 102 to perform SUL transmission.

In other words, the first user equipment performs cell search and synchronization by using a first downlink carrier, and receives a downlink signal and/or a downlink channel. The first user equipment performs supplementary uplink SUL transmission by using a second uplink carrier. The first user equipment may further perform uplink transmission by using a first uplink carrier corresponding to the first downlink carrier. The second user equipment performs cell search and synchronization by using a second downlink carrier, and receives a downlink signal and/or a downlink channel. The second user equipment performs supplementary uplink SUL transmission by using the first uplink carrier. The second user equipment may further perform uplink transmission by using the second uplink carrier corresponding to the second downlink carrier.

Optionally, a frequency channel number of a band in which the first uplink carrier is located is different from a frequency channel number of the band in which the second uplink carrier is located, and the first uplink carrier and the second uplink carrier belong to a same cell.

It should be understood that uplink carriers of the first user equipment 102 and the second user equipment 103 may be SUL carriers of each other, so that a capacity is increased, and a capacity of an uplink access resource is multiplied. After the first user equipment 102 and the second user equipment 103 access the cell, bands available for uplink transmission may also be multiplied.

It should be understood that when sending the first uplink signal/uplink channel by using the determined SUL band, the first user equipment 102 may send the first uplink signal/uplink channel by using some or all of uplink time domain resources of the SUL band. With reference to different scenarios, the following describes a plurality of possible time domain resource configuration manners by using an example in which the first user equipment 102 multiplexes the TDD band of the second user equipment 103 as the SUL band. In a possible implementation, ranges of resources of the first user equipment 102 and the second user equipment 103 may be in different TDD bands, or may be in a same TDD band. For example, the SUL resource of the first user equipment 102 and the NUL resource and the NDL resource of the second user equipment 103 are located in different slots, or located at different frequency domain locations in a same slot, or even uplink resource ranges of the first user equipment 102 and the second user equipment 103 may completely or partially overlap.

In another possible implementation, an embodiment of this application further provides another resource determining method. A base station and first user equipment are also used as an example. The method specifically includes the following steps.

(1) The first user equipment receives, by using a second downlink carrier, first configuration information sent by the base station, where the first configuration information indicates configuration information of a first uplink carrier.

(2) The base station sends a second downlink signal and/or a downlink channel to the first user equipment by using the second downlink carrier, where a band in which the second downlink carrier is located is a band used for supplementary downlink SDL transmission, and the first uplink carrier and the second downlink carrier belong to a same cell.

(3) The first user equipment sends a first uplink signal and/or an uplink channel to a network device by using the first uplink carrier.

(4) The base station receives the first uplink signal and/or the uplink channel by using the first uplink carrier.

The first uplink carrier is used for supplementary uplink SUL transmission, and a band in which the first uplink carrier is located further includes another resource used for downlink transmission. The band in which the first uplink carrier is located is a TDD band. The band in which the second downlink carrier is located is a band used for supplementary downlink SDL transmission, and the first uplink carrier and the second downlink carrier belong to a same cell.

It should be understood that the foregoing solution describes a case in which this embodiment of this application is further applicable to SDL transmission. To be specific, when there is only the second downlink carrier, a band used for SUL transmission is determined based on the second downlink carrier. Details are not described herein.

Figure 4:
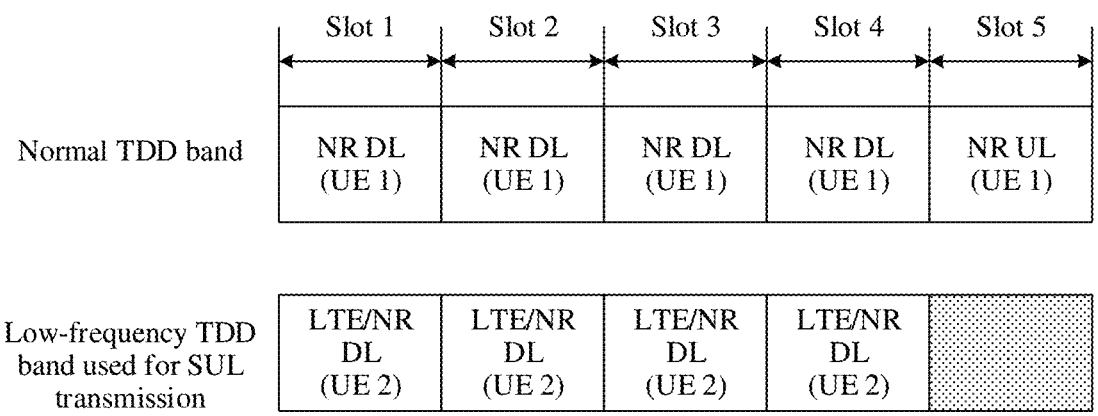
FIG. 4 is a schematic diagram of a resource configuration according to an embodiment of this application.

FIG. 4 is a schematic diagram of a resource configuration according to an embodiment of this application. A normal TDD band may be understood as the "first band" described in FIG. 2, and a TDD band used for SUL transmission may be understood as the "SUL band". In addition, the SUL band may also be used for NUL transmission and NDL transmission of the second user equipment 103. In addition, in FIG. 4, a slot 5 shown in a shadow part is a time domain resource that can be flexibly configured as an uplink resource, a downlink resource, or an SUL resource in the TDD band.

It should be understood that a time domain resource of the SUL band may be configured in a unit of a subframe and/or a slot and/or a symbol. In this embodiment of this application, a possible time domain resource configuration process is described by using a slot as an example. Configuration in a unit of a subframe, a symbol, or the like may not be described. A configuration unit of a time domain resource of the SUL band is not limited in this embodiment of this application.

As shown in FIG. 4, five slots used by the first user equipment 102 to perform downlink transmission (DL) in the normal TDD band are listed, and are denoted as a slot 1 to a slot 5. The five slot resources and five slot resources that are used by the second user equipment 103 to perform downlink transmission (DL) in a low-frequency TDD band used for SUL transmission are the same, and are located at different frequency domain locations. For the foregoing scenario, in this embodiment of this application, specifically, for different scenarios, a low-frequency TDD band is properly multiplexed, and a time domain resource of the SUL band is allocated.

The following describes possible implementation processes in three frequency ranges with reference to the implementation process in FIG. 3 and scenarios of different frequency ranges. In this process, in a TDD band in an existing LTE scenario or NR scenario, some UL resources in the TDD band are multiplexed for SUL transmission. In this way, compatibility with a live network can be implemented based on support of a live network.

Scenario 1: 2010 MHz to 2025 MHz Frequency Band

It should be understood that the 2010 MHz to 2025 MHz band is currently further used for transmission in the TDD band in the LTE scenario. At an early development stage of NR, in a short term, the 2010 MHz to 2025 MHz band cannot be cleared and used as a dedicated SUL resource. In addition, when both SUL and DL are deployed in the 2010 MHz to 2025 MHz band, a problem of uplink and downlink cross interference may be caused, which can be avoided by using the method for determining an SUL band described in FIG. 3.

For example, in an existing 2010 MHz to 2025 MHz LTE TDD band, some UL resources of the TDD band are multiplexed for SUL transmission. An SUL band used for SUL transmission corresponds to a band n95, and a first band associated with the SUL band may be a TDD band or an FDD band of another NR cell. Herein, a 2.6 GHz band is used as an example.

A first band in which the first user equipment 102 of NR normally operates is a 2.6 GHz TDD band, and time domain of a band used for SUL transmission of the first user equipment of NR 102 is some UL resources in a band n95 (2010 MHz to 2025 MHz). The second user equipment 103 of LTE operates in an LTE TDD band of the 2010 MHz to 2025 MHz frequency band and is configured to perform downlink transmission in the TDD band. In conclusion, the first user equipment 102 of NR and the second user equipment 103 of LTE may implement multiplexing in a TDD band of the 2010 MHz to 2025 MHz frequency band, to implement spectrum sharing.

Optionally, if network load of the TDD band is heavy in the LTE scenario, or there are a large quantity of user equipments operating in an LTE mode, resources used for DL transmission and SUL transmission may be allocated in the TDD band by using an uplink-downlink configuration commonly used in LTE.

Figure 5:
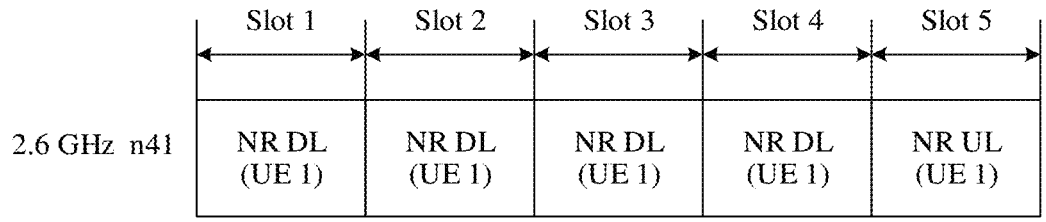
FIG. 5 is a schematic diagram of another resource configuration according to an embodiment of this application.
Figure 5:
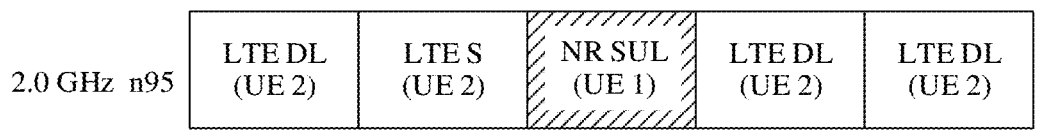

For example, FIG. 5 is a schematic diagram of another resource configuration according to an embodiment of this application. As shown in FIG. 5, for a 2.6 GHz TDD band n41, four of five slots are used for DL transmission of the first user equipment 102, and one of the five slots is used for UL transmission of the first user equipment 102. A corresponding SUL band is a 2.0 GHz TDD band n95, and a resource corresponding to one of the five slots is configured for SUL transmission of the first user equipment 102. This configuration may be denoted as "DSUDD".

A slot before the slot used for SUL transmission is configured as a special slot (special slot, S). The special slot may provide time for the first user equipment 102 to perform conversion between signal receiving and signal sending, to improve transmission reliability.

In another possible implementation, as network load of the TDD band in the LTE scenario decreases, or as a quantity of accessed user equipments in the LTE scenario decreases, more uplink resources may be configured for the TDD band for SUL transmission.

Figure 6:
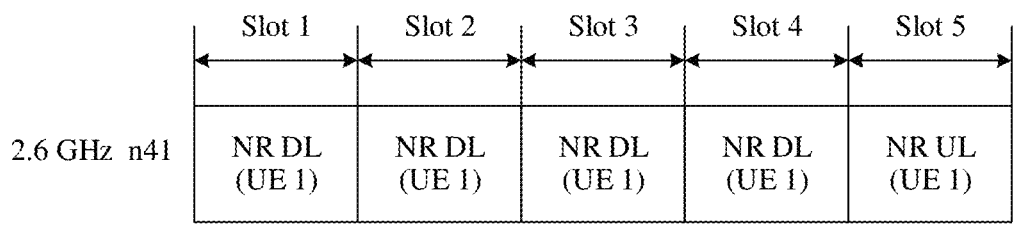
FIG. 6 is a schematic diagram of still another resource configuration according to an embodiment of this application.
Figure 6:
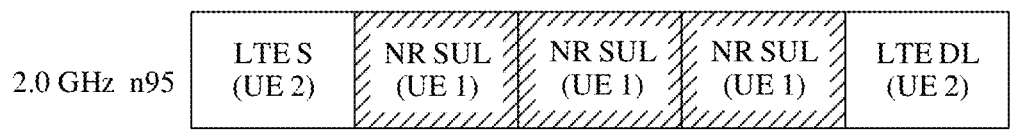

For example, FIG. 6 is a schematic diagram of still another resource configuration according to an embodiment of this application. As shown in FIG. 6, for a 2.0 GHz TDD band n95 corresponding to a 2.6 GHz TDD band, resources corresponding to three of five slots are configured for SUL transmission of the first user equipment 102, and this configuration may be denoted as "DSUUU". Alternatively, the DSUUU is offset by one slot to become SUUUD in FIG. 6.

In the foregoing SUL resource configuration manner, more resources may be configured for SUL transmission, to better support an uplink transmission service in the NR scenario, and increase uplink resources in the NR scenario.

Figure 7:
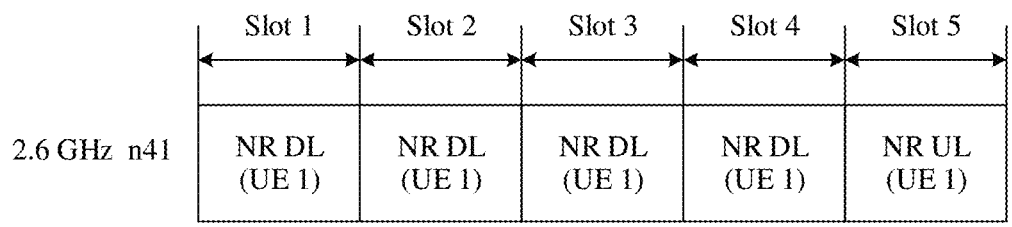
FIG. 7 is a schematic diagram of yet another resource configuration according to an embodiment of this application.
Figure 7:
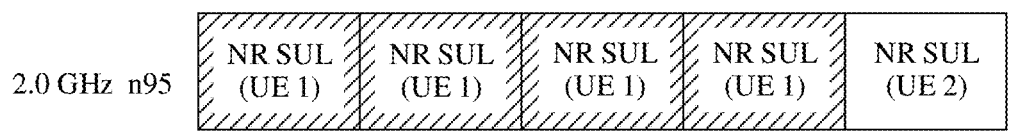

In still another possible implementation, with development of network technologies in the NR scenario, user equipments in the LTE scenario continuously decrease, and finally, the TDD band may be used as a dedicated SUL resource through band clearance. For example, FIG. 7 is a schematic diagram of yet another resource configuration according to an embodiment of this application. As shown in FIG. 7, for a 2.0 GHz TDD band n95 corresponding to a 2.6 GHz TDD band, all resources corresponding to five slots are configured for SUL transmission of the first user equipment 102. In this configuration, band clearance of the TDD band can be implemented, so that the TDD band can be used as a dedicated SUL resource.

Scenario 2: 2300 MHz to 2400 MHz Frequency Band

It should be understood that the 2300 MHz to 2400 MHz band is currently further used for TDD transmission in the LTE scenario. At an early development stage of NR, in a short term, the 2300 MHz to 2400 MHz band cannot be cleared and used as a dedicated SUL resource. In addition, when both SUL and DL are deployed in the 2300 MHz to 2400 MHz band, a problem of uplink and downlink cross interference may be caused, which can be avoided by using the method for determining an SUL band described in FIG. 3.

For example, in an existing LTE TDD (2300 MHz to 2400 MHz) band, some UL resources of the TDD band are multiplexed for SUL transmission. An SUL band used for SUL transmission may be a band n110, nxxx, or the like. A first band associated with the SUL band may be a TDD/FDD band of another NR cell. Herein, a 2.6 GHz or 4.9 GHz frequency band is used as an example.

A first band in which the first user equipment 102 of NR normally operates is a 2.6 GHz TDD band or a 4.9 GHz TDD carrier, and an SUL band used for SUL transmission of the first user equipment 102 of NR is some UL resources in the 2300 MHz to 2400 MHz band. The second user equipment 103 of LTE operates in an LTE TDD band of the 2300 MHz to 2400 MHz frequency band, and may be configured to perform downlink transmission in the TDD band. In conclusion, the first user equipment 102 of NR and the second user equipment 103 of LTE may implement multiplexing in a TDD band of the 2300 MHz to 2400 MHz frequency band, to implement spectrum sharing.

Optionally, if network load of the TDD band is heavy in the LTE scenario, or there are a large quantity of user equipments operating in an LTE mode, resources used for DL transmission and SUL transmission may be allocated in the TDD band by using an uplink-downlink configuration commonly used in LTE.

Figure 8:
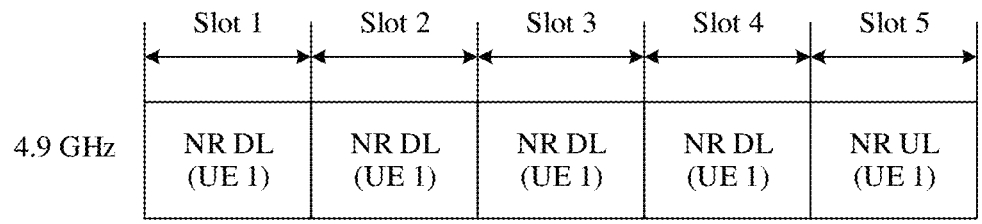
FIG. 8 is a schematic diagram of still yet another resource configuration according to an embodiment of this application.
Figure 8:
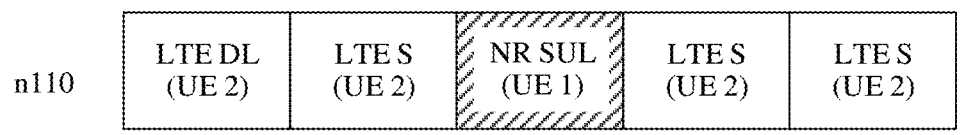

For example, FIG. 8 is a schematic diagram of still yet another resource configuration according to an embodiment of this application. As shown in FIG. 8, for a 4.9 GHz TDD band, four of five slots are used for DL transmission of the first user equipment 102, and one of the five slots is used for UL transmission of the first user equipment 102. For a corresponding SUL band n110, a resource corresponding to one of the five slots is configured for SUL transmission of the first user equipment 102, and this configuration may be denoted as "DSUSS".

Figure 9:
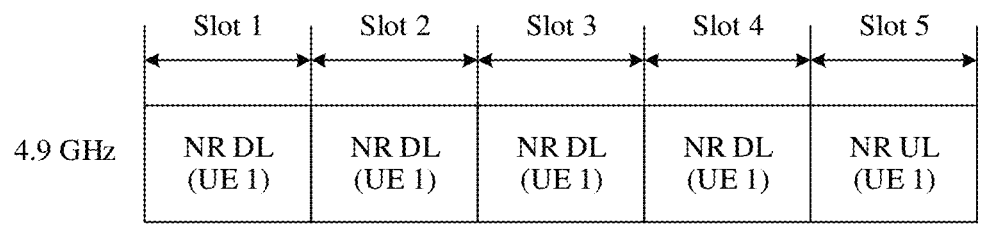
FIG. 9 is a schematic diagram of a further resource configuration according to an embodiment of this application.
Figure 9:
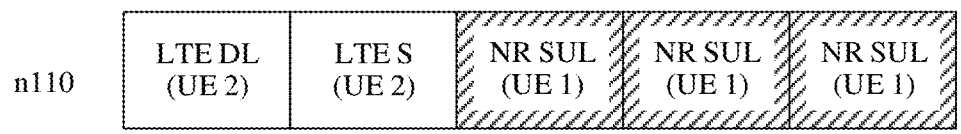

In another possible implementation, as the network load of the TDD band in the LTE scenario decreases, or as a quantity of accessed user equipments in the LTE scenario decreases, more uplink resources may be configured for the TDD band for SUL transmission. For example, FIG. 9 is a schematic diagram of a further resource configuration according to an embodiment of this application. As shown in FIG. 9, for a band n110 corresponding to a 4.9 GHz TDD band, resources corresponding to three of five slots are configured for SUL transmission of the first user equipment 102, and this configuration may be denoted as "DSUUU", to better support an uplink transmission service in the NR scenario and increase uplink resources in the NR scenario.

In the foregoing SUL resource configuration manner, more resources may be configured for SUL transmission, to better support the uplink transmission service in the NR scenario, and increase the uplink resources in the NR scenario.

Figure 10:
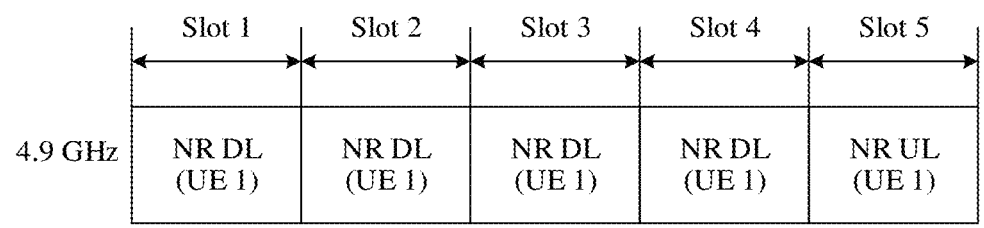
FIG. 10 is a schematic diagram of a still further resource configuration according to an embodiment of this application.
Figure 10:
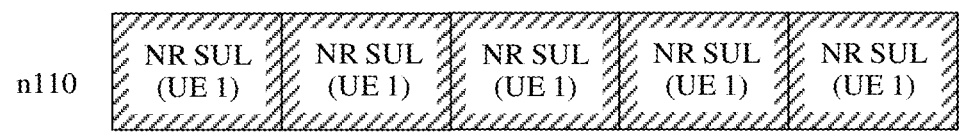

In still another possible implementation, with development of network technologies in the NR scenario, user equipments in the LTE scenario continuously decrease, and finally, the TDD spectrum may be used as a dedicated SUL resource through frequency clearance. For example, FIG. 10 is a schematic diagram of a still further resource configuration according to an embodiment of this application. As shown in FIG. 10, for a band n111 corresponding to a 4.9 GHz TDD band, all resources corresponding to five slots are configured for SUL transmission of the first user equipment 102. In this configuration, band clearance of the TDD band can be implemented, so that the TDD band can be used as a dedicated SUL resource.

Scenario 3: 2496 MHz to 2690 MHz Frequency Band

In a 2.6 GHz (2496 MHz to 2690 MHz) TDD band n41, some UL resources of the TDD band are multiplexed for SUL transmission.

Specifically, in China, the 2.6 GHz TDD band is a 5G NR basic network of an operator China Mobile, and can provide a good full coverage capability. In addition, a 4.9 GHz (4800 MHz to 4900 MHz) band n79 owned by China Mobile is also a 5G spectrum. Considering an important spectrum in second wave cell deployment such as network capacity expansion, a potential deployment mode is to deploy the 4.9 GHz TDD band and the 2.6 GHz TDD band in a co-existence manner. However, an uplink coverage area of the 2.6 GHz TDD band is different from that of the 4.9 GHz TDD band. A potential way to improve the uplink coverage area of the 4.9 GHz TDD band is to use a part of uplink of the 2.6 GHz TDD band to assist the 4.9 GHz band in improving the uplink coverage area of the 4.9 GHz TDD band. In this way, the first user equipment that performs access in the 4.9 GHz band can enjoy the coverage area of the 2.6 GHz TDD band in a single-cell access manner, to help implement co-coverage and co-deployment of the 2.6 GHz/4.9 GHz band.

Figure 11:
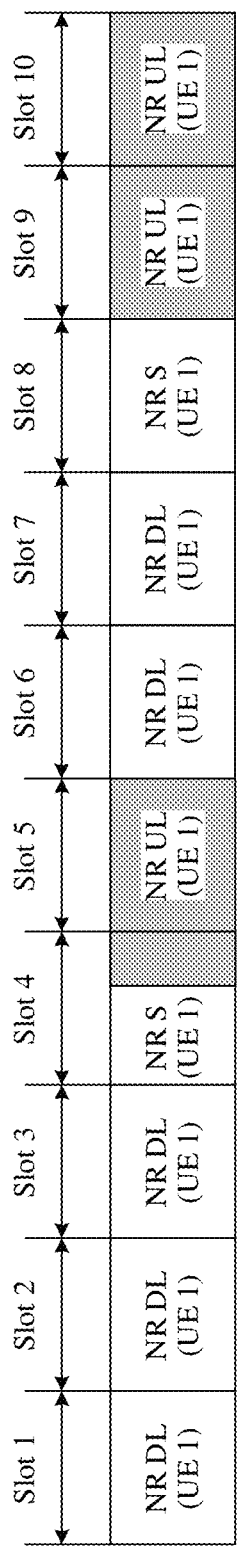
FIG. 11 is a schematic diagram of a yet further resource configuration according to an embodiment of this application.

For example, FIG. 11 is a schematic diagram of a yet further resource configuration according to an embodiment of this application. As shown in FIG. 11, for a 4.9 GHz TDD band, three of 10 slots are used for UL transmission of the first user equipment 102, and a corresponding SUL band is a 2.6 GHz TDD band. Resources corresponding to two of the 10 slots are configured for SUL transmission of the first user equipment 102. Details are not described herein.

In the foregoing SUL resource configuration manner, more resources may be configured for SUL transmission, to better support the uplink transmission service in the NR scenario, and increase the uplink resources in the NR scenario.

In conclusion, this embodiment of this application provides a method for determining an SUL band. Some UL resources in an existing TDD band and/or FDD band are multiplexed for SUL transmission, so that the TDD band and/or the FDD band can be used for SUL transmission provided that there is the TDD band and/or the FDD band, and no dedicated SUL resource or spectrum is required for SUL transmission. This weakens a requirement for band deployment, and resolves a problem of difficulty in obtaining SUL resources. In addition, multiplexing the TDD band for SUL transmission can be better compatible with existing TDD band deployment and support smooth network evolution. This meets an operators' requirement for flexible network deployment and a strong requirement for smooth network evolution, accelerates industry chain unification, and accelerates global development.

The foregoing describes in detail the method for determining an SUL band in embodiments of this application with reference to FIG. 1 to FIG. 11. The following describes in detail an apparatus for determining an SUL band in embodiments of this application with reference to FIG. 12 to FIG. 15.

Figure 12:
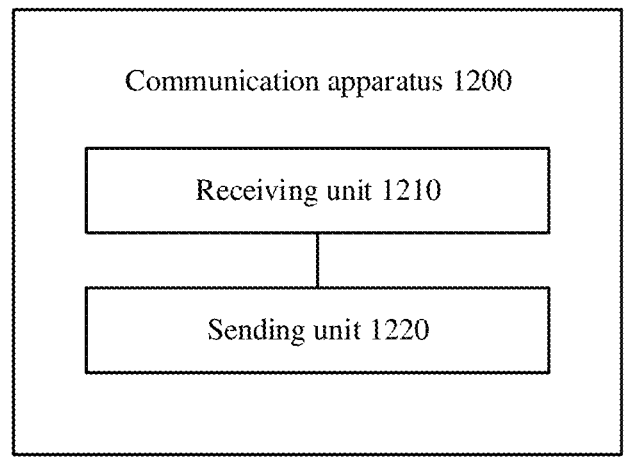
FIG. 12 is a schematic diagram of an apparatus for determining an SUL band according to an embodiment of this application.

FIG. 12 is a schematic block diagram of an apparatus 1200 for determining an SUL band according to an embodiment of this application. The apparatus 1200 may correspond to the base station 101 described in the method 300, or may be a chip or a component applied to the base station 101. In addition, modules or units in the apparatus 1200 are separately configured to perform actions or processing processes performed by the base station 101 in the method 300. As shown in FIG. 12, the communication apparatus 1200 may include a receiving unit 1210 and a sending unit 1220.

The receiving unit 1210 is configured to receive a first uplink signal and/or an uplink channel by using a first uplink carrier, where the first uplink carrier is used for supplementary uplink SUL transmission, a band in which the first uplink carrier is located further includes another resource used for downlink transmission, and the band in which the first uplink carrier is located is a TDD band.

The sending unit 1220 is configured to send a second downlink signal and/or a downlink channel by using a second downlink carrier, where a band in which the second downlink carrier is located is a TDD band or an FDD band used for uplink transmission and downlink transmission.

In a possible implementation, a frequency channel number of the band in which the first uplink carrier is located is different from a frequency channel number of a band in which a second uplink carrier corresponding to the second downlink carrier is located.

In another possible implementation, the first uplink carrier is associated with a first identifier.

Optionally, the first identifier is different from an identifier of the TDD band in which the first uplink carrier is located.

Optionally, the first identifier defines the band in which the first uplink carrier is located as an SUL band; or the first identifier defines a band combination, and the band combination is a band combination of at least one first uplink carrier and the second uplink carrier.

In another possible implementation, the first identifier is the same as an identifier of the TDD band in which the first uplink carrier is located, the first identifier further includes first indication information, and the first indication information indicates whether the TDD band in which the first uplink carrier is located is used for SUL transmission.

Optionally, the first indication information is predefined information, or the first indication information is explicit indication information.

In still another possible implementation, when the TDD band or the band combination in which the first uplink carrier is located is used for SUL transmission, the method further includes: receiving capability information reported by user equipment. The capability information includes the first identifier; or the capability information indicates that the user equipment is used for uplink transmission, downlink transmission, and/or sidelink transmission in the TDD band in which the first uplink carrier is located; or the capability information indicates that the user equipment is not used for SUL transmission in the TDD band in which the first uplink carrier is located; or the capability information indicates that the user equipment supports both TDD transmission and SUL transmission, and a priority of a capability of performing SUL transmission by the user equipment is lower than a priority of a capability of performing TDD transmission by the user equipment.

In a possible implementation, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

Specifically, the receiving unit 1210 is configured to perform S330 in the method 300, and the sending unit 1220 is configured to perform S31o and S340 in the method 300. A specific process of performing the foregoing corresponding steps by each unit is described in detail in the method 300. For brevity, details are not described herein again.

Figure 13:
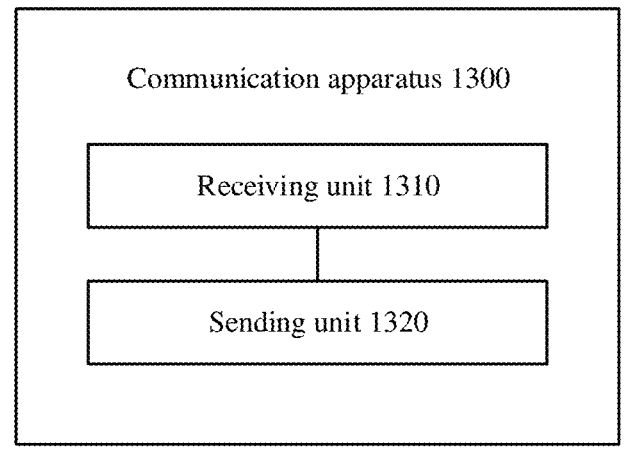
FIG. 13 is a schematic diagram of another apparatus for determining an SUL band according to an embodiment of this application.

FIG. 13 is a schematic block diagram of an apparatus 1300 for determining an SUL band according to an embodiment of this application. The apparatus 1300 may correspond to (for example, may be applied to or may be) the base station described in the method 400. In addition, modules or units in the apparatus 1300 are separately configured to perform actions or processing processes performed by the base station in the method 400. As shown in FIG. 13, the communication apparatus 1300 may include a receiving unit 1310 and a sending unit 1320.

The receiving unit 1310 is configured to receive first configuration information by using a second downlink carrier, where the first configuration information indicates configuration information of a first uplink carrier, and the configuration information of the first uplink carrier includes slot and/or symbol configuration information indicating supplementary uplink SUL transmission. Bands in which a second uplink carrier and the second downlink carrier corresponding to the second uplink carrier are located each are a TDD band or an FDD band used for uplink transmission and downlink transmission. The first uplink carrier is used for SUL transmission, and a frequency channel number of a band in which the first uplink carrier is located is different from a frequency channel number of the band in which the second uplink carrier is located, and the first uplink carrier and the second downlink carrier belong to a same cell.

The sending unit 1320 is configured to send a first uplink signal and/or an uplink channel to a network device by using the first uplink carrier.

In a possible implementation, the first uplink carrier is associated with a first identifier.

Optionally, the first identifier is different from an identifier of the TDD band in which the first uplink carrier is located.

Optionally, the first identifier defines the band in which the first uplink carrier is located as an SUL band; or the first identifier defines a band combination, and the band combination is a band combination of at least one first uplink carrier and the second uplink carrier.

In another possible implementation, the first identifier is the same as an identifier of the TDD band in which the first uplink carrier is located, the first identifier further includes first indication information, and the first indication information indicates whether the TDD band in which the first uplink carrier is located is used for SUL transmission.

Optionally, the first indication information is predefined information, or the first indication information is explicit indication information.

In still another possible implementation, when the TDD band or the band combination in which the first uplink carrier is located is used for SUL transmission, the method further includes: reporting capability information to the network device. The capability information includes the first identifier; or the capability information indicates that user equipment is used for uplink transmission, downlink transmission, and/or sidelink transmission in the TDD band in which the first uplink carrier is located; or the capability information indicates that the user equipment is not used for SUL transmission in the TDD band in which the first uplink carrier is located; or the capability information indicates that the user equipment supports both TDD transmission and SUL transmission, and a priority of a capability of performing SUL transmission by the user equipment is lower than a priority of a capability of performing TDD transmission by the user equipment.

In a possible implementation, a slot and/or a symbol used by the first uplink carrier are/is configured as a subset of uplink slots and/or symbols and flexible slots and/or symbols to which the band in which the first uplink carrier is located belongs; or a slot and/or a symbol used by the first uplink carrier are/is configured as a subset of uplink slots and/or symbols or flexible slots and/or symbols to which the band in which the first uplink carrier is located belongs.

Specifically, the receiving unit 1310 is configured to perform S310 in the method 300, and the sending unit 1320 is configured to perform S330 in the method 300. A specific process of performing the foregoing corresponding steps by each unit is described in detail in the method 300. For brevity, details are not described herein again.

Figure 14:
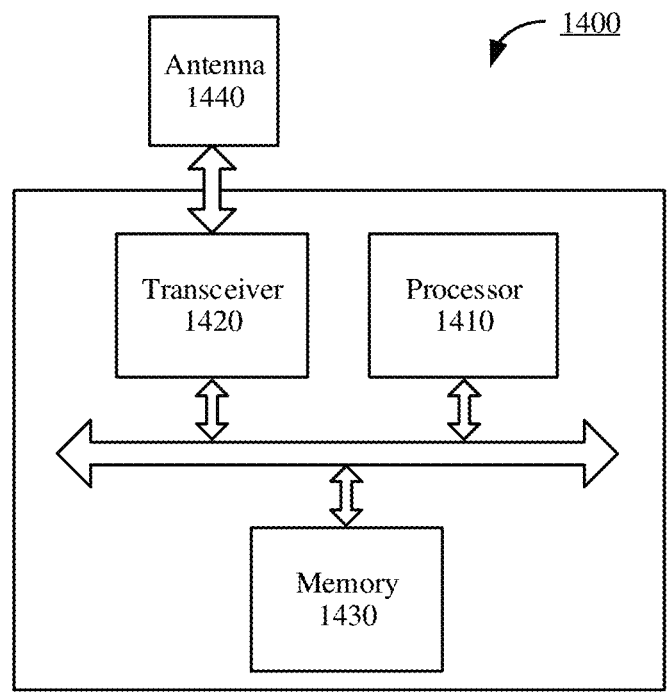
FIG. 14 is a schematic diagram of still another apparatus for determining an SUL band according to an embodiment of this application.

FIG. 14 is a schematic diagram of a structure of a terminal device 1400 according to an embodiment of this application. As shown in FIG. 14, the terminal device 1400 includes a processor 1410 and a transceiver 1420. Optionally, the terminal device 1400 further includes a memory 1430. The processor 1410, the transceiver 1420, and the memory 1430 may communicate with each other through an internal connection path, to transfer a control signal and/or a data signal. The memory 1430 is configured to store a computer program. The processor 1410 is configured to invoke and run the computer program in the memory 1430, to control the transceiver 1420 to receive and send a signal.

The processor 1410 and the memory 1430 may be integrated into one processing apparatus. The processor 1410 is configured to execute program code stored in the memory 1430 to implement the function of the terminal device in the method embodiments. During specific implementation, the memory 1430 may also be integrated into the processor 1410, or may be independent of the processor 1410. The transceiver 1420 may be implemented by using a transceiver circuit.

The terminal device may further include an antenna 1440, configured to send, by using a radio signal, uplink data or uplink control signaling output by the transceiver 1420, or send, after receiving downlink data or downlink control signaling, the downlink data or the downlink control signaling to the transceiver 1420 for further processing.

It should be understood that, the apparatus 1400 may correspond to the terminal device in the method 300 according to embodiments of this application, and the apparatus 1400 may alternatively be a chip or a component used in the terminal device. In addition, the modules in the apparatus 1400 implement corresponding procedures in the method 300 in FIG. 4. Specifically, the memory 1430 is configured to store program code, so that when executing the program code, the processor 1410 controls the transceiver 1420 to perform S310, S330, and S340 in the method 300. A specific process in which each unit performs the foregoing corresponding steps is described in detail in the method 300. For brevity, details are not described herein again.

Figure 15:
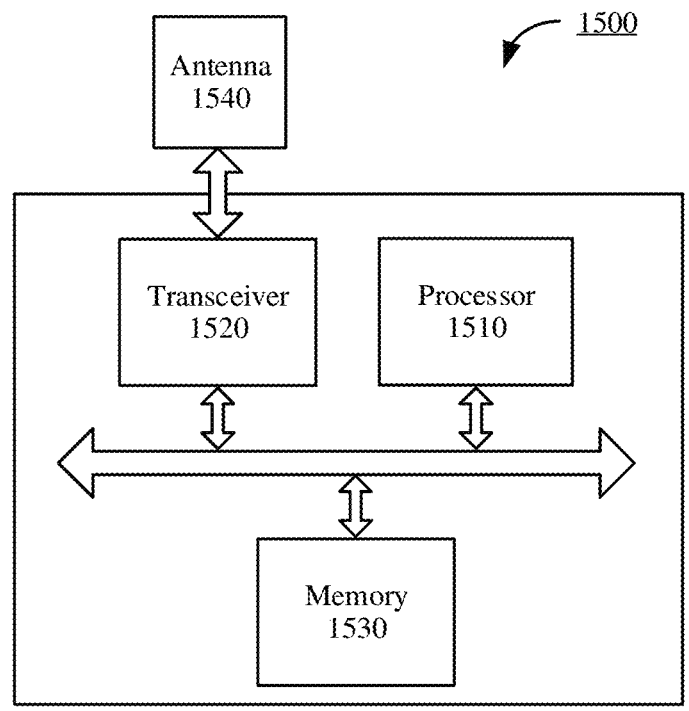
FIG. 15 is a schematic diagram of yet another apparatus for determining an SUL band according to an embodiment of this application.

FIG. 15 is a schematic diagram of a structure of a network device 1500 according to an embodiment of this application. As shown in FIG. 15, the network device 1500 (for example, a base station) includes a processor 1510 and a transceiver 1520. Optionally, the network device 1500 further includes a memory 1530. The processor 1510, the transceiver 1520, and the memory 1530 may communicate with each other through an internal connection path, to transfer a control signal and/or a data signal. The memory 1530 is configured to store a computer program. The processor 1510 is configured to invoke and run the computer program in the memory 1530, to control the transceiver 1520 to receive and send a signal.

The processor 1510 and the memory 1530 may be integrated into one processing apparatus. The processor 1510 is configured to execute program code stored in the memory 1530 to implement the function of the base station in the method embodiments. During specific implementation, the memory 1530 may alternatively be integrated into the processor 1510, or may be independent of the processor 1510. The transceiver 1520 may be implemented by using a transceiver circuit.

The network device may further include an antenna 1540, configured to send, by using a radio signal, downlink data or downlink control signaling that is output by the transceiver 1520, or send, after receiving uplink data or uplink control signaling, the uplink data or the uplink control signaling to the transceiver 820 for further processing.

It should be understood that, the apparatus 1500 may correspond to the base station in the method 300 according to embodiments of this application, and the apparatus 1500 may alternatively be a chip or a component used in the base station. In addition, the modules in the apparatus 1500 implement corresponding procedures in the method 300 in FIG. 3. Specifically, the memory 1530 is configured to store program code, so that when executing the program code, the processor 1510 controls the processor 1510 to perform S320 in the method 300, and the transceiver 1520 is configured to perform S310, S330, and S330 in the method 300. A specific process in which each unit performs the foregoing corresponding steps is described in detail in the method 300. For brevity, details are not described herein again.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the described system, apparatus, and unit, refer to a corresponding process in the method embodiments. Details are not described herein again.

In several embodiments provided in this application, it should be understood that the disclosed system, apparatus, and method may be implemented in other manners. For example, the described apparatus embodiments are only examples. For example, the unit division is only logical function division and may be other division during actual implementation. For example, a plurality of units or components may be combined. In addition, the displayed or discussed mutual couplings or communication connections may be indirect couplings or communication connections through some interfaces, apparatuses, or units.

In addition, function units in the embodiments of this application may be integrated into one physical entity, or each of the units may be separately corresponding to one physical entity, or two or more units may be integrated into one physical entity.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

What is claimed is:

1. A method, comprising:
receiving a first uplink signal and/or an uplink channel using a first uplink carrier, wherein the first uplink carrier is configured for supplementary uplink (SUL) transmission, a band in which the first uplink carrier is located comprises a resource configured for downlink transmission, and the band in which the first uplink carrier is located is a time division duplex (TDD) band; and
sending a second downlink signal and/or a downlink channel using a second downlink carrier, wherein a band in which the second downlink carrier is located is a TDD band or an FDD band configured for uplink transmission and downlink transmission, and the band in which the second downlink carrier is located is based on the first uplink carrier.

2. The method according to claim 1, wherein a frequency of the band in which the first uplink carrier is located is different from a frequency of a band in which a second uplink carrier corresponding to the second downlink carrier is located.

3. The method according to claim 1, wherein the first uplink carrier is associated with a first identifier.

4. The method according to claim 3, wherein the first identifier is different from an identifier of the TDD band in which the first uplink carrier is located.

5. The method according to claim 3, wherein
the first identifier indicates that the band in which the first uplink carrier is located is an SUL band usable for SUL transmission; or
the first identifier indicates a band combination of the first uplink carrier and a second uplink carrier corresponding to the second downlink carrier.

6. The method according to claim 3, wherein the first identifier is same as an identifier of the TDD band in which the first uplink carrier is located, the first identifier further comprises first indication information, and the first indication information indicates whether the TDD band in which the first uplink carrier is located is usable for SUL transmission.

7. The method according to claim 6, wherein the first indication information is predefined information, or the first indication information is explicit indication information.

8. The method according to claim 3, wherein when the TDD band in which the first uplink carrier is located or a band combination of the first uplink carrier and a second uplink carrier corresponding to the second downlink carrier is used for SUL transmission, the method further comprises:
receiving capability information reported by user equipment, wherein
the capability information comprises the first identifier;
the capability information indicates that the user equipment is configured to perform uplink transmission, downlink transmission, or sidelink transmission in the TDD band in which the first uplink carrier is located;
the capability information indicates that the user equipment is not configured to perform SUL transmission in the TDD band in which the first uplink carrier is located; or
the capability information indicates that the user equipment supports both TDD transmission and SUL transmission, and a priority of an SUL transmission capability of the user equipment is lower than a priority of a TDD transmission capability of the user equipment.

9. The method according to claim 1, wherein a slot or a symbol used by the first uplink carrier is configured as a subset of uplink slots or symbols and flexible slots or symbols to which the band in which the first uplink carrier is located belongs; or
a slot or a symbol used by the first uplink carrier is configured as a subset of uplink slots or symbols or flexible slots or symbols to which the band in which the first uplink carrier is located belongs.

10. A method, comprising:
receiving first configuration information using a second downlink carrier, wherein the first configuration information indicates configuration information of a first uplink carrier for supplementary uplink (SUL) transmission, the configuration information of the first uplink carrier comprises slot and/or symbol configuration information for the SUL transmission, bands in which a second uplink carrier, corresponding to the second downlink carrier, and the second downlink carrier are located each are a time division duplex (TDD) band or a frequency division duplex (FDD) band configured for uplink transmission and downlink transmission, a frequency of a band in which the first uplink carrier is located is different from a frequency of a band in which the second uplink carrier is located, and the first uplink carrier and the second downlink carrier belong to a same cell; and
sending a first uplink signal and/or an uplink channel to a network device using the first uplink carrier.

11. The method according to claim 10, wherein the first uplink carrier is associated with a first identifier.

12. The method according to claim 11, wherein the first identifier is different from an identifier of the band in which the first uplink carrier is located.

13. The method according to claim 11, wherein
the first identifier indicates that the band in which the first uplink carrier is located is an SUL band usable for SUL transmission; or the first identifier indicates a band combination of the first uplink carrier and the second uplink carrier corresponding to the second downlink carrier.

14. The method according to claim 11, wherein the first identifier is same as an identifier of a TDD band in which the first uplink carrier is located, the first identifier further comprises first indication information, and the first indication information indicates whether the TDD band in which the first uplink carrier is located is usable for SUL transmission.

15. The method according to claim 14, wherein the first indication information is predefined information, or the first indication information is explicit indication information.

16. The method according to claim 11, wherein when the band in which the first uplink carrier is located or a band combination of the first uplink carrier and the second uplink carrier corresponding to the second downlink carrier is used for SUL transmission, the method further comprises: reporting capability information to the network device, wherein
the capability information comprises the first identifier;
the capability information indicates that the user equipment is configured to perform uplink transmission, downlink transmission, or sidelink transmission in the band in which the first uplink carrier is located;
the capability information indicates that the user equipment is not configured to perform SUL transmission in the band in which the first uplink carrier is located; or
the capability information indicates that the user equipment supports both TDD transmission and SUL transmission, and a priority of an SUL transmission capability of the user equipment is lower than a priority of a TDD transmission capability of the user equipment.

17. The method according to claim 10, wherein a slot or a symbol used by the first uplink carrier is configured as a subset of uplink slots or symbols and flexible slots or symbols to which the band in which the first uplink carrier is located belongs; or a slot or a symbol used by the first uplink carrier is configured as a subset of uplink slots or symbols or flexible slots or symbols to which the band in which the first uplink carrier is located belongs.

18. A communication apparatus, comprising:
a non-transitory memory, configured to store program instructions and data; and
a processor, configured to couple to the memory, and the processor is configured to invoke the program instructions to cause the communication apparatus to perform:
receiving a first uplink signal and/or an uplink channel using a first uplink carrier, wherein the first uplink carrier is configured for supplementary uplink (SUL) transmission, a band in which the first uplink carrier is located comprises a resource configured for downlink transmission, and the band in which the first uplink carrier is located is a time division duplex (TDD) band; and
sending a second downlink signal and/or a downlink channel using a second downlink carrier, wherein a band in which the second downlink carrier is located is a TDD band or an FDD band configured for uplink transmission and downlink transmission, and the band in which the second downlink carrier is located is based on the first uplink carrier.

19. The communication apparatus according to claim 18, wherein a frequency of the band in which the first uplink carrier is located is different from a frequency of a band in which a second uplink carrier corresponding to the second downlink carrier is located.

20. The communication apparatus according to claim 18, wherein the first uplink carrier is associated with a first identifier.

* * * * *